United States Patent
Moon et al.

(10) Patent No.: US 7,623,884 B2
(45) Date of Patent: Nov. 24, 2009

(54) RSMA CONTROL DEVICE AND METHOD FOR MOBILE COMMUNICATION SYSTEM

(75) Inventors: Hi-Chan Moon, Seoul (KR); Jae-Min Ahn, Seoul (KR); Jae-Yoel Kim, Kunpo-shi (KR); Hee-Won Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 1367 days.

(21) Appl. No.: 10/365,150

(22) Filed: Feb. 12, 2003

(65) Prior Publication Data

US 2003/0123413 A1 Jul. 3, 2003

Related U.S. Application Data

(62) Division of application No. 09/436,902, filed on Nov. 9, 1999.

(30) Foreign Application Priority Data

| Nov. 9, 1998 | (KR) | ................................. 98-048494 |
| Nov. 13, 1998 | (KR) | ................................. 98-049155 |
| Nov. 16, 1998 | (KR) | ................................. 98-049651 |

(51) Int. Cl.
 *H04B 7/00* (2006.01)
(52) U.S. Cl. ........................... 455/522; 455/69; 370/318
(58) Field of Classification Search ................ 370/335, 370/336, 322, 347, 508, 342, 328, 345, 349, 370/350, 318; 455/522, 69; 375/130, 137, 375/149
See application file for complete search history.

(56) References Cited

U.S. PATENT DOCUMENTS

| 4,689,787 | A | * | 8/1987 | Hotta ........................ 370/508 |
| 5,444,862 | A | * | 8/1995 | Hibino ..................... 455/67.11 |
| 5,604,730 | A | * | 2/1997 | Tiedemann, Jr. ............. 455/69 |
| 5,673,259 | A |   | 9/1997 | Quick, Jr. |
| 5,732,328 | A | * | 3/1998 | Mitra et al. ................... 455/69 |
| 5,757,767 | A | * | 5/1998 | Zehavi ....................... 370/347 |
| 5,828,662 | A |   | 10/1998 | Jalali et al. |
| 5,930,706 | A |   | 7/1999 | Raith |
| 6,163,679 | A | * | 12/2000 | Bakke et al. ............... 455/12.1 |
| 6,166,622 | A | * | 12/2000 | Hosur et al. ................ 455/522 |
| 6,233,455 | B1 | * | 5/2001 | Ramakrishna et al. ...... 455/437 |
| 6,252,865 | B1 | * | 6/2001 | Walton et al. ............... 370/335 |
| 6,256,301 | B1 | * | 7/2001 | Tiedemann et al. ......... 370/336 |
| 6,347,231 | B1 | * | 2/2002 | Miya .......................... 455/522 |
| 6,411,817 | B1 | * | 6/2002 | Cheng et al. ................ 455/522 |
| 6,483,816 | B2 | * | 11/2002 | Tsunehara et al. ............ 455/69 |
| 6,487,191 | B1 | * | 11/2002 | Kang et al. ................. 370/342 |
| 6,614,771 | B1 | * | 9/2003 | Kim et al. .................... 370/335 |

(Continued)

Primary Examiner—Raymond S Dean
(74) Attorney, Agent, or Firm—The Farrell Law Firm, LLP

(57) ABSTRACT

An access request message transmission device for a mobile station in a CDMA communication system employing RSMA in which a base station assigns a reverse common channel in response to an access request message from the mobile station, and the mobile station transmits a message to the base station over the assigned reverse common channel. The access request message transmission device includes a hash ID generator for generating a multi-bit hash ID for exclusively using the reverse common channel; a traffic information generator for generating multi-bit traffic information representing traffic information on the reverse common channel; and an access channel transmitter for generating the access request message using the hash ID and the traffic information, and transmitting the generated access request message to the base station over an access channel.

7 Claims, 20 Drawing Sheets

U.S. PATENT DOCUMENTS

| | | | |
|---|---|---|---|
| 6,717,916 B1 * | 4/2004 | Ahn et al. | 455/522 |
| 6,782,035 B1 * | 8/2004 | Nakamura et al. | 375/130 |
| 6,968,201 B1 * | 11/2005 | Gandhi et al. | 455/522 |
| 7,069,033 B1 * | 6/2006 | Moon et al. | 455/226.2 |
| 2002/0090965 A1 * | 7/2002 | Chen et al. | 455/522 |
| 2004/0136336 A1 * | 7/2004 | Nakamura et al. | 370/328 |
| 2005/0221833 A1 * | 10/2005 | Granzow et al. | 455/561 |
| 2006/0094459 A1 * | 5/2006 | DeClerk et al. | 455/522 |

\* cited by examiner

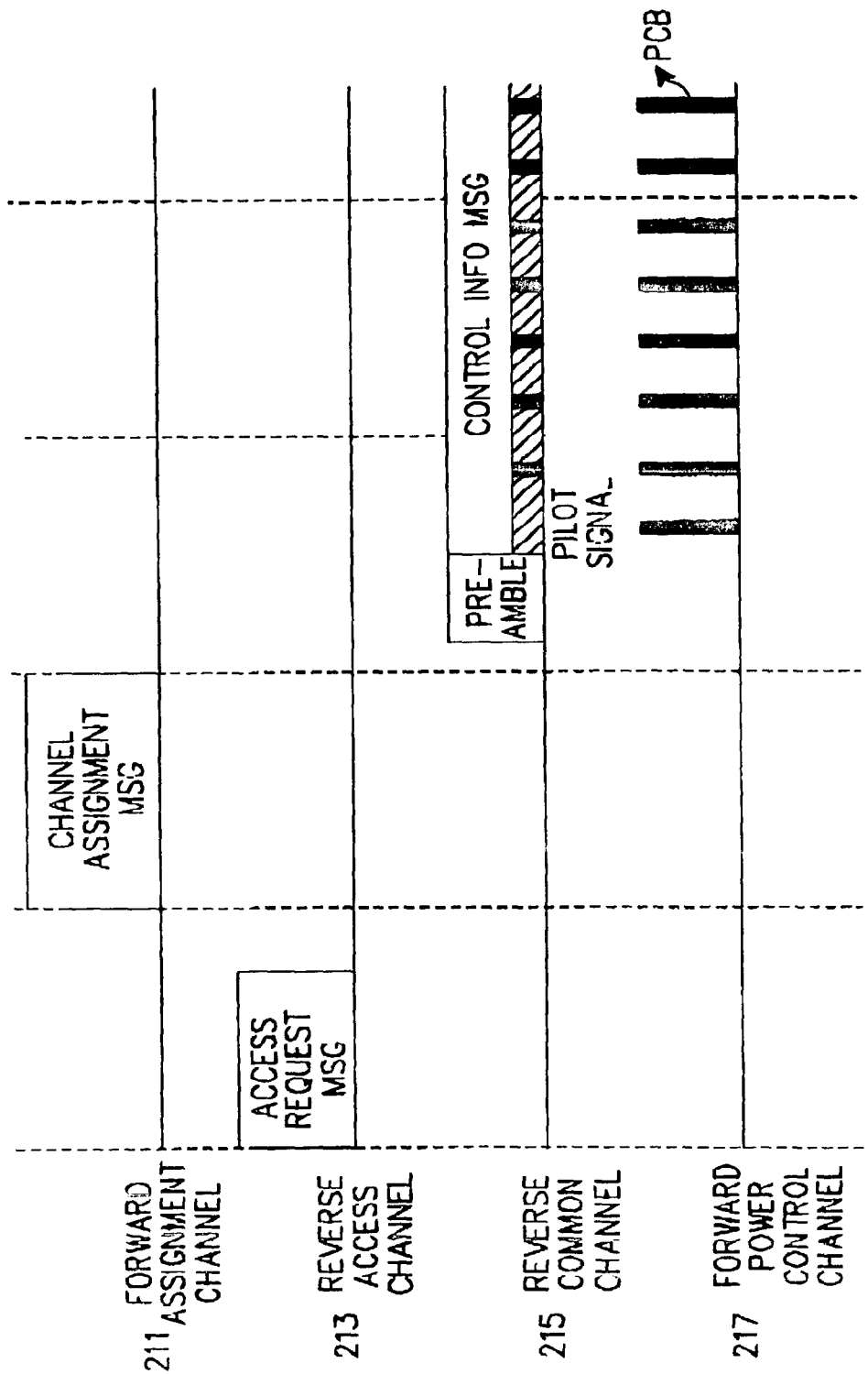

RSMA CONTROL DEVICE AND METHOD FOR MOBILE COMMUNICATION SYSTEM

This application is a Divisional of co-pending U.S. patent application Ser. No. 09/436,902, filed on Nov. 9, 1999 which claimed priority to Korean Patent Application Serial No. 48494/1998, filed Nov. 9, 1998, Korean Patent Application Serial No.: 49155/1998, filed Nov. 13, 1998 and Korean Patent Application Serial No.: 49651/1998, filed Nov. 16, 1998.

BACKGROUND OF THE INVENTION

1. Field of the Invention

The present invention relates generally to a reverse common channel communication device and method for a mobile communication system, and in particular, to an RSMA (Reservation Multiple Access) communication device and method.

2. Description of the Related Art

In general, CDMA (Code Division Multiple Access) mobile communication systems have evolved from a conventional mobile communication standard which primarily provided voice service, to an IMT-2000 standard which provides a high-speed data service in addition to the voice service. The current IMT-2000 standard provides high-quality voice service, moving picture service, and Internet search services. In the CDMA mobile communication system, a communication link exists between a mobile station (MS) and a base station (BS) and is divided into a forward link for transmitting a signal from the base station to the mobile station and a reverse link for transmitting a signal from the mobile station to the base station.

In the conventional CDMA communication system, the mobile station uses a slotted Aloha method to access the base station over the reverse link. Prior to describing this method, a description will be made regarding the term "slots" in the context of CDMA communications. When exchanging a message in a mobile communication system, the mobile stations and base stations schedule a message transmission start time as a reference time. This reference time is called a "slot", and a state where the reference time is scheduled is called a "slotted state". To connect a call to a base station, a mobile station randomly selects one of a plurality of access code channels for the reverse link, and continuously sends a preamble for allowing a message transmitted over the access channel at a slot to be detected by the base station, and a data message for connection.

FIG. 1 shows access messages transmitted by a plurality of mobile stations using the slotted Aloha method.

In the slotted Aloha method, there is the possibility that two different mobile stations will transmit access channel messages at the same slot and in the same access code channel. If a base station receives the two access messages at a same slot of the access channel, the base station cannot separate nor process the two access messages. Specifically, since the mobile stations use the same frequency and PN (Pseudo Noise) code, and the same long code for the access channel, the base station cannot distinguish the access channel messages when two or more mobile stations transmit access channel messages simultaneously and at the same slot. This situation is commonly called a collision between the two messages. In this method, since the access message has a very long length of about 200 mm/s, the collision may result in much loss of data.

Referring to FIG. 2A, when a mobile station connects a call to the base station or has data to transmit over a reverse common channel, the mobile station randomly selects one of a plurality of reverse access channels and transmits a message having user information and control information over the selected channel at a slot, as shown by 213. At this point, if the base, station can process the message from the mobile station, the base station transmits a channel assignment message to the mobile station over a common assignment channel at a slot, as shown by 211. Upon failure to detect the message transmitted from the mobile station over the access channel, the base station cannot send channel assignment message to the mobile station. The mobile station then retransmits the message upon failure to receive any message while monitoring the common assignment channel for a predetermined time.

In addition, when a collision happens between the messages transmitted from two different mobile stations, the base station cannot process the messages. Therefore, the base station cannot send the channel assignment message. Even in this case, the mobile stations retransmit the messages upon failure to receive any message while monitoring the common assignment channel for a predetermined time. In this situation, a time delay is much shorter as compared with the slotted Aloha method since the message is very short in length.

When the base station sends a channel assignment message to the mobile station, the mobile station examines whether a channel has been assigned, and sends a message to the base station over a reverse common channel, as shown by 215. The message on the reverse common channel can be transmitted together with a pilot signal and a power control signal, as shown by 215. Upon receipt of the message, the base station performs channel estimation using the received signals in order to send power control bits (PCDs) for the reverse link over a power control channel.

FIG. 2B shows an RSMA (Reservation Multiple Access) procedure in a mobile communication system using the method of FIG. 2A.

Currently, a mobile station and a base station using the RSMA method have not been proposed in the mobile communication system. In order to communicate over a reverse common channel using the RSMA method, it is necessary to construct a message to use when the mobile station sends an RSMA request to the base station. In addition, it is also necessary to construct a channel assignment message for the base station in response to the RSMA request from the mobile station, and to control the power of the reverse common channel assigned by RSMA.

SUMMARY OF THE INVENTION

It is, therefore, an object of the present invention to provide an improved RSMA communication device and method for solving the above problems in a mobile communication system.

It is another object of the present invention to provide a device and method for constructing an access request message to use when a mobile station sends an RSMA communication request to a base station in a mobile communication system.

It is an additional object of the present invention to provide a device and method for constructing a channel assignment message for assigning a reverse common channel in response to an RSMA communication request received from a mobile station in a mobile communication system.

It is yet another object of the present invention to provide a device and method for enabling a base station to control power of a reverse common channel assigned by RSMA in a mobile communication system.

It is still another object of the present invention to provide a device and method for enabling a base station to assign a reverse common channel by RSMA and control power of the assigned reverse common channel in a mobile communication system.

It is still another object of the present invention to provide a device and method for enabling a mobile station to construct an access request message for sending an RSMA communication request to a base station and control transmission power of a reverse common channel assigned by the base station in a mobile communication system.

To achieve the above objects, there is provided an access request message transmission device for a mobile station in a CDMA communication system employing RSMA in which a base station assigns a reverse common channel in response to an access request message from the mobile station, and the mobile station transmits a message to the base station over the assigned reverse common channel. The access request message transmission device includes a hash ID generator for generating a multi-bit hash ID for exclusively using the reverse common channel; a traffic information generator for generating multi-bit traffic information representing traffic information on the reverse common channel; and an access channel transmitter for generating the access request message using the hash ID and the traffic information, and for transmitting the generated access request message to the base station over an access channel.

The traffic information includes traffic transfer rate information, one-frame length information, and message length information. The access channel transmitter comprises a CRC (Cyclic Redundancy Check) generator and a tail bit generator, wherein the access channel transmitter creates an access request message comprised of the hash ID, traffic information, CRC bits and tail bits. The hash ID generator creates the hash ID based on an ESN (Electronic Serial Number).

BRIEF DESCRIPTION OF THE DRAWINGS

The above and other objects, features and advantages of the present invention will become more apparent from the following detailed description when taken in conjunction with the accompanying drawings in which:

FIG. 2A is a diagram illustrating a procedure performed when a mobile station sends an access request to a base station;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention proposes an RSMA mobile communication system, in which a mobile station sends an access request to a base station by an RSMA method, and the base station then assigns a reverse common channel by RSMA and controls transmission power of the assigned reverse common channel. First, a definition will be given regarding the structure of an access request message used when a mobile station accesses a reverse common channel by the RSMA method, and then a description will be made regarding how to create the access request message. Second, a definition will be given regarding a message used when the base station assigns a reverse common channel in response to an access request message generated from the mobile station by RSMA, and then a description will be made regarding how to generate the message. Third, a description will be made regarding a procedure in which the base station transmits information for controlling power of the assigned reverse common channel and the mobile station controls transmission power of the reverse common channel assigned by RSMA according to the power control information.

Figure 3:
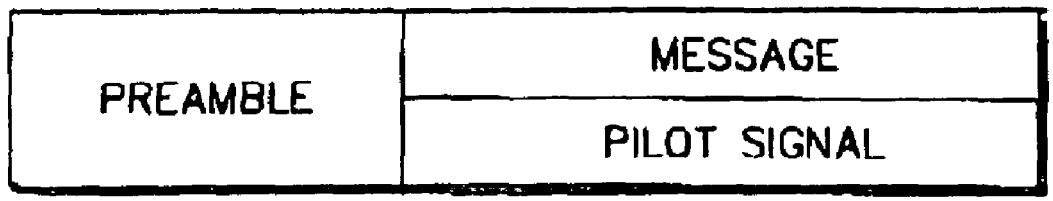
FIGS. 3 and 4 are diagrams illustrating the structures of an access channel signal according to an embodiment of the present invention.
Figure 4:

A description will be made with regard to the structure of an access request message used when the mobile station makes an RSMA access request and the method and procedure for generating the access request message. In the access procedure, it is assumed that the mobile station receives access channel-related information from a service base station over a forward common channel other than a broadcasting channel and a forward common assignment channel. The access channel-related information includes information about whether ESN (Electronic Serial Number) and/or hash ID are used, power-up/down step information during power control, and preamble length information. The reason for not sending the information over the forward common assignment channel is to minimize a queue delay of the forward common assignment channel so that the mobile station can make a prompt access request. During access, the mobile station sends the base station a message including information about the user and information about the traffic signal. This access channel message is constructed to include the above information in two different methods. FIGS. 3 and 4 show the structures of the access channel message according to an embodiment of the present invention.

Referring to FIG. 3, the access channel message is comprised of a preamble, a message and a pilot signal. In order to enable the base station to acquire this message, the mobile station first sends the preamble of predetermined length and then sends the message and pilot signal having a length of 5 msec. The pilot signal is sent for channel estimation, and the channel estimation is performed to decode the message.

FIG. 4 shows another structure of the access channel message. Referring to FIG. 4, the access channel message is comprised of a message and a pilot signal excluding the preamble of FIG. 3. In this structure, the mobile station sends the pilot signal used for channel estimation at higher power instead of sending the preamble. A message having this structure can be sent at the lower power as compared with a message having the structure of FIG. 3, so that it is possible to increase channel capacity, decrease interference and decrease delay in transmitting the message.

Figure 5:
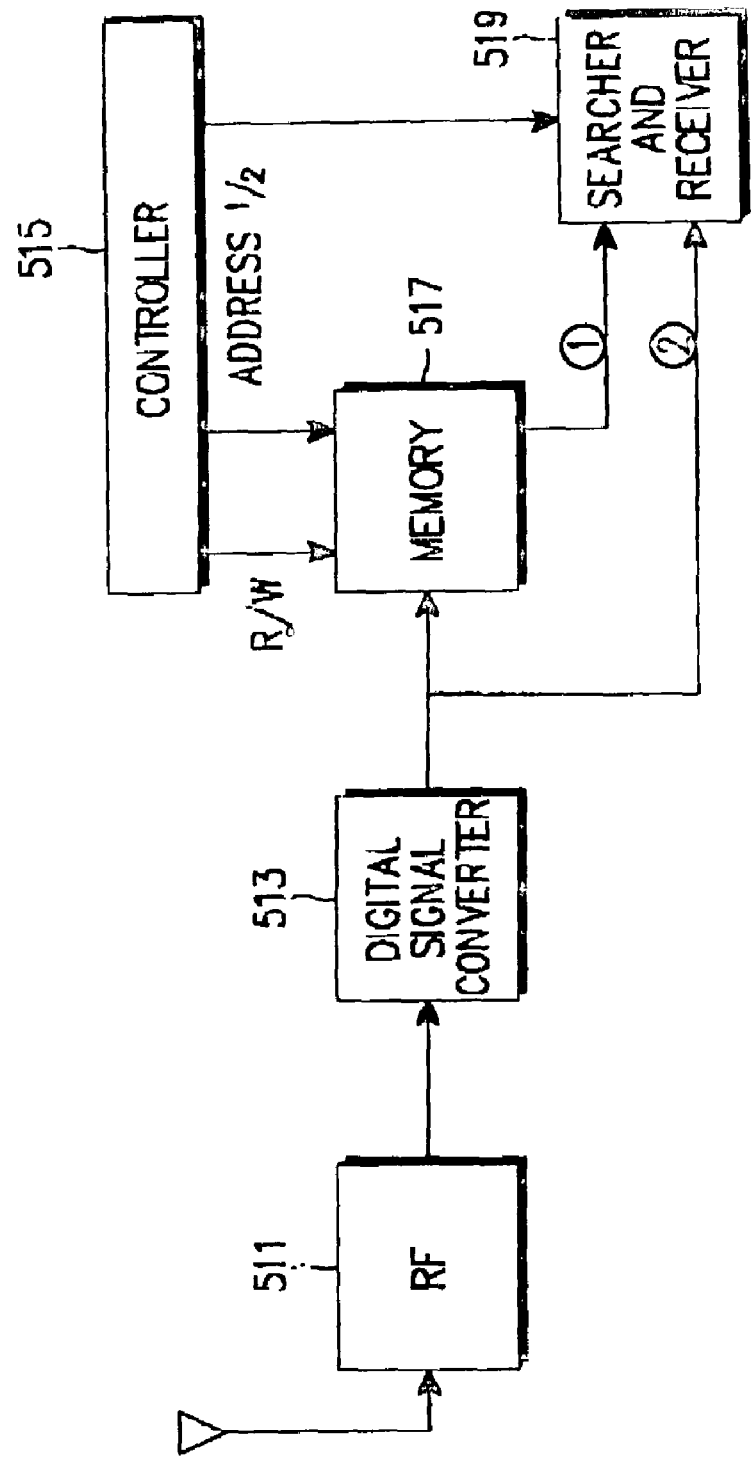
FIG. 5 is a block diagram illustrating a receiver for a base station.

FIG. 5 shows a receiver for a base station, which receives the access channel messages of FIGS. 3 and/or 4.

Referring to FIG. 5, the receiver includes a digital signal converter 513, a memory 517 for storing a signal output from the digital converter 513, and a searcher and Rake receiver 519. The searcher searches for a signal output from the memory 517 or a signal output from the digital signal converter 513 and the Rake receiver demodulates the searched signal. A controlled 515 controls the memory 517, and the searcher and receiver 519.

Figure 6:
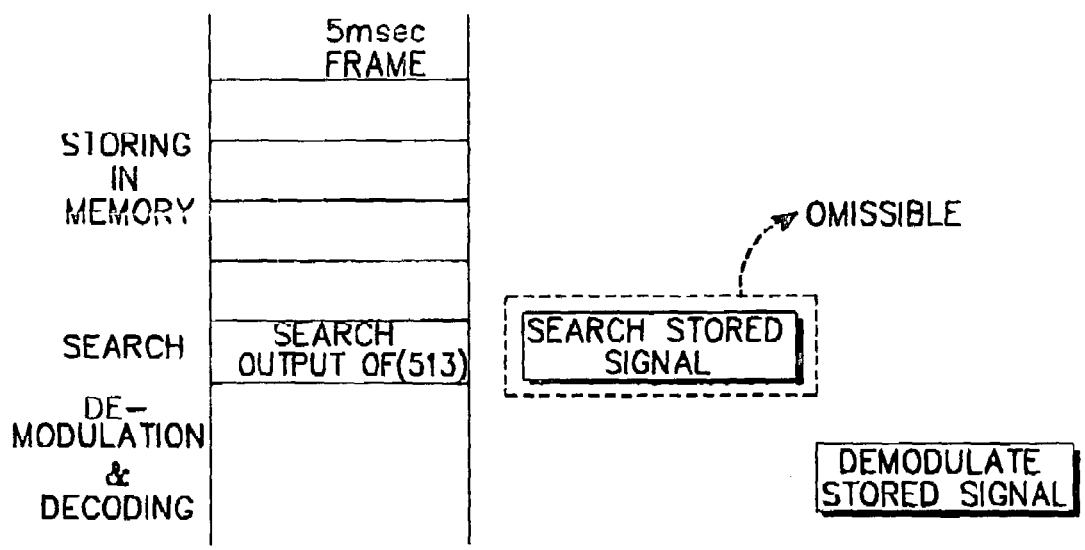
FIGS. 6 and 7 are diagrams for explaining the operation of the receiver as shown in FIG. 5.

Referring to FIG. 6, there is shown the operation of the base station receiver shown in FIG. 5 The controller 515 of the base station receiver stores an input signal in the memory 517 for 5 ms frame duration. At the same time, the searcher and receiver 519 performs searching based on the input signal. If the search is not completed after a lapse of the 5 ms frame, the controller 515 accesses the input signal stored in the memory 517 and provides the input signal to the searcher and receiver 519 so that the searcher can continue searching. When the signal is acquired and a multipath is detected through searching, the receiver of the searcher and receiver 519 decodes the stored input signal and performs CRC (Cyclic Redundancy Check) of the decoded message.

Figure 7:
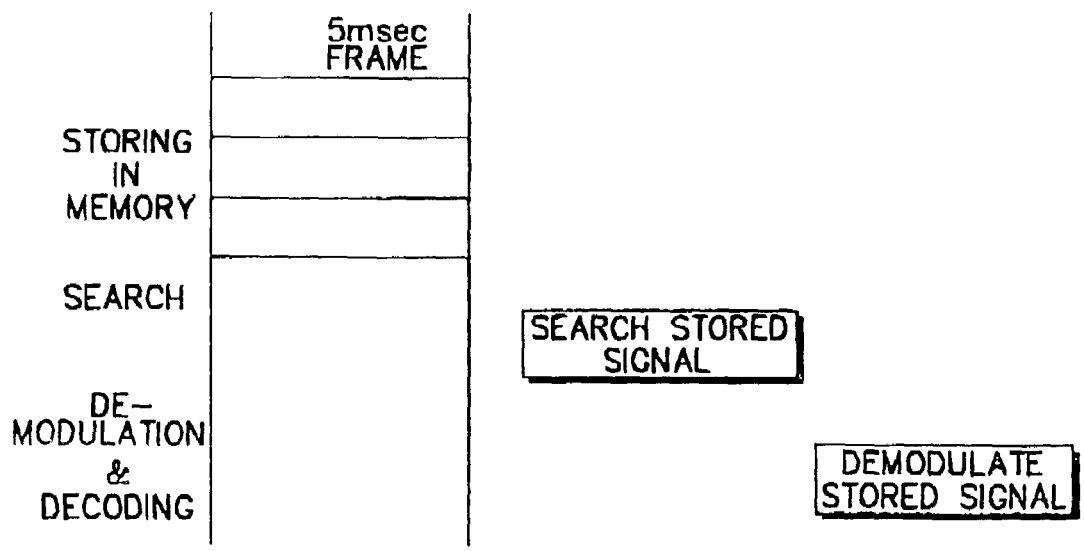

Referring to FIG. 7, there is shown another example of the operation of the base station receiver shown in FIG. 5. Controller 515 of the base station receiver stores an input signal in the memory 517 for 5 ms frame duration. After storing the 5 ms frame, the controller 515 controls the memory 517 and the searcher and receiver 519 to perform searching using the input signal stored in the memory 517. When the signal is acquired and a multipath is detected through searching, the receiver of the searcher and receiver 519 demodulates and decodes the input signal stored in the memory 517 and performs CRC of the decoded message.

Figure 8:
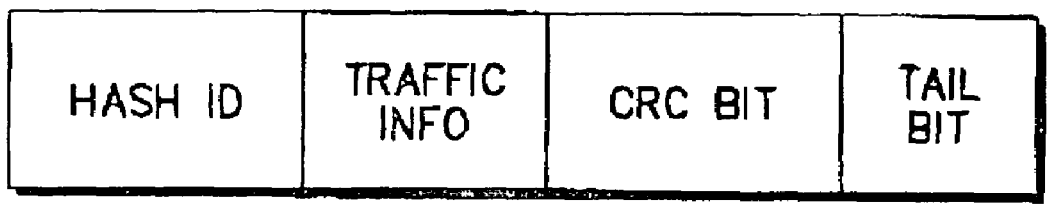
FIGS. 8 and 10 are diagrams illustrating the structures of message bits out of an access channel signal.
Figure 10:

With regard to the two structures of the access channel message shown in FIGS. 3 and 4, the message bits can be constricted in two different methods. FIGS. 8 and 10 show the message structures according to the above two methods. The two message structures both include CRC bits. It is also possible to transmit a short message excluding the CRC bits. In this case, a base station searcher should have a sufficiently low false alarm probability. In order to achieve a high detection probability in addition to the low false alarm probability, the preamble or pilot required for acquisition should have higher power. By adding the CRC bits, it is possible to remove a message received with errors through CRC checking after demodulating the message. Even though a false alarm is generated in the base station, it is possible to lower a threshold of the searcher. Therefore, there is not required a preamble of high energy for acquisition, and the received message has a higher reliability.

Specifically, FIG. 8 shows the structure of a message transmitted at 9600 bps when a coding rate $R=\frac{1}{4}$ convolutional encoder is used.

Referring to FIG. 8, a first structure of message bits according to an embodiment of the present invention includes 16-bit user ID, 8-bit traffic information, 16 CRC bits, and 8 tail bits. In this message structure, the traffic information can be comprised of 3 bits which represent information about a traffic transfer rate and a one-frame length, and 5 bits which represent information about a message length. The user ID can be either a unique ID assigned to each mobile station or a hash ID for which several mobile stations can use the same hash ID. The hash ID has an ID number shorter in length than the ESN which is a unique number of the mobile station, and is defined such that two or more mobile stations can have the same ID number. In the embodiment, the hash ID is comprised of 16 bits. The hash ID can be either information obtained by compressing a 32-bit ESN, a unique number of the mobile station, into 16 bits using a hush function, or a specific number selected by the mobile station. The mobile station's unique ID can be either a number having a unique value everywhere like the ESN or an ID which is temporarily assigned to the mobile station at a specific time in a specific area. The CRC bits are used for detecting errors contained in the information and reduce the probability of the message containing errors. A description will now be made with reference to an embodiment in which a 16-bit hash ID is used for the user ID.

Figure 9:
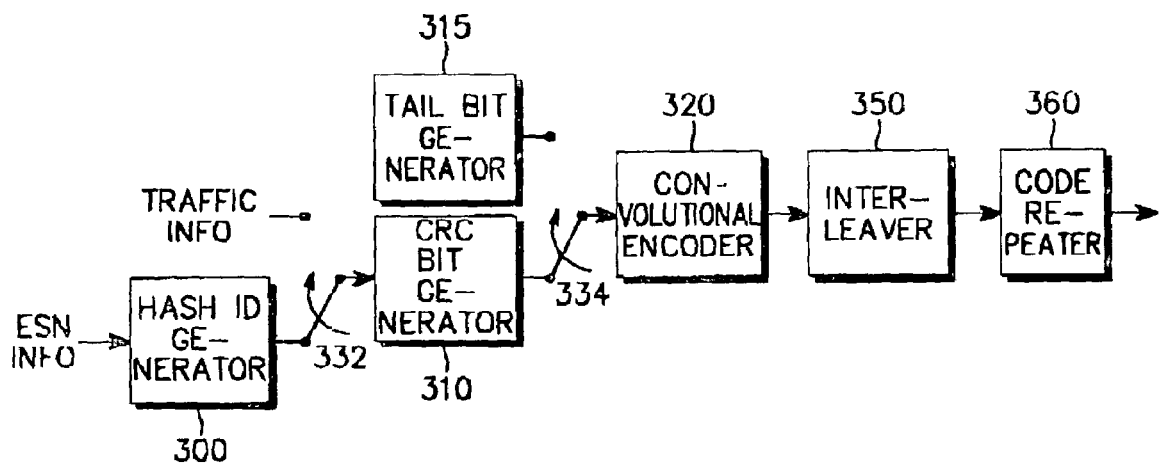
FIG. 9 is a block diagram illustrating a device for constructing a message as shown in FIG. 8.

FIG. 9 shows a device for generating a message having the structure of FIG. 8. In the embodiment of FIG. 9, the hash ID is information obtained by compressing a 32-bit ESN, a unique number of the mobile station, into 16 bits using a hash function.

Referring to FIG. 9, upon receipt of a 32-bit ESN, a number unique to each mobile station, a hash ID generator 300 generates a 16-bit hash ID using a hash function. At this point, a first switch 332 connects the hash ID generator 300 to a CRC bit generator 310. When the hash ID is input to the CRC bit generator 310, first switch 332 is switched to a traffic information input node to input traffic information to the CRC bit generator 310. If the hash ID and traffic information are input to the CRC bit generator 310 in this manner, the CRC bit generator 310 calculates CRC bits for the input signals, and upon completion of CRC bit calculation for every input bit, first outputs the input bits and then outputs the 16 CRC bits.

When the CRC bit generator 310 starts outputting the input bits, a second switch 334 connects the CRC bit generator 310 to a convolutional encoder 320 so that the output bits of the CRC bit generator 310 are input to the convolutional encoder 320. Here, the convolutional encoder 320 uses a coding rate R=¼. When the output bits of the CRC bit generator 310 are completely input to the convolutional encoder 320, the second switch 334 is switched to a tail bit generator 315 to input the tail bits to the convolutional encoder 320. The convolutional encoder 320 encodes the input bits. Upon completion of the encoding process, the encoded symbols are interleaved by an interleaver 350. The interleaved encoded symbols are input to a code repeater 360 symbol by symbol, where the input symbols are repeated 8 times.

FIG. 10 shows a second structure of message bits according to an embodiment of the present invention.

Referring to FIG. 10, a message having the second, structure according to the present invention includes 32-bit ESN information which is a 5 ms frame having a bit rate of 14.4 Kbps, 16-bit traffic information, 16 CRC bits, and 8 tail bits. Unlike the structure of FIG. 8, the ESN information which is a unique ID of the mobile station is used, as it is, without hashing.

Figure 11A:
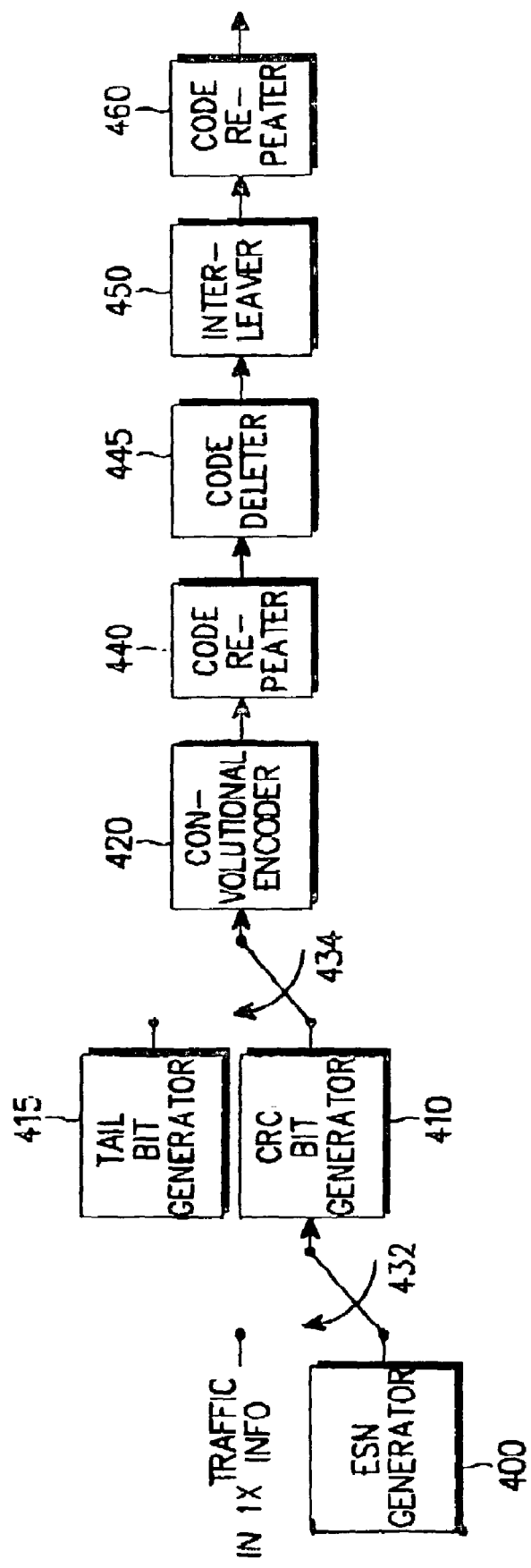
FIGS. 11A and 11B are block diagrams illustrating a device for constructing a message as shown in FIG. 10.
Figure 11B:
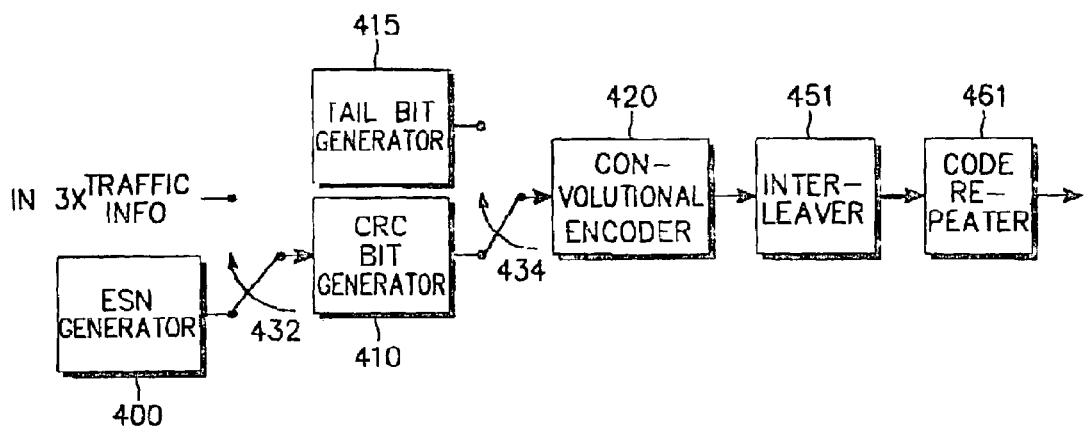

FIGS. 11A and 11B show devices for constructing the message having the structure of FIG. 10. More specifically, FIG. 11A shows a message constructing device for a 1× system, and FIG. 11B shows a message constructing device for a over-3× system.

Referring to FIG. 11A, a description will be made with regard to a message constructing device for a 1× system. A first switch 432 connects an ESN generator 400 to a CRC bit generator 410 to input 32-bit ESN information, a unique ID of the mobile station, output from the ESN generator 400 to the CRC bit generator 410. Thereafter, the first switch 432 is switched to traffic information input node to input traffic information to the CRC bit generator 410. If the ESN information and traffic information are input to the CRC bit generator 410 in this manner, the CRC bit generator 410 calculates CRC bits for the input signals, and upon completion of CRC bit calculation for every input bit, first outputs the input bits and then outputs the 16 CRC bits.

When the CRC bit generator 410 starts outputting the input bits, a second switch 434 connects the CRC bit generator 410 to a convolutional encoder 420 so that the output bits of the CRC bit generator 410 are input to the convolutional encoder 420. Here, the convolutional encoder 420 uses a coding rate R=¼. When the output bits of the CRC bit generator 410 are completely input to the convolutional encoder 420, the second switch 434 is switched to a tail bit generator 415 to input the tail bits to the convolutional encoder 420. The convolutional encoder 420 encodes the input bits. The encoded symbols are input to a code repeater 440 symbol by symbol, where the input symbols are repeated 2 times. The repeated symbols are input to code deleter 445, which deletes every third symbol from the input symbols and outputs other symbols as they are. The symbols output from the code deleter 445 are interleaved by an interleaver 450, and the interleaved symbols are then input to a code repeater 460 symbol by symbol, where the input symbols are repeated 4 times.

Referring to FIG. 11B, a description will be made with regard to a message constructing device, for a 3× system. A first switch 432 connects an ESN generator 400 to a CRC bit generator 410 to input 32-bit ESN information, a unique ID of the mobile station, output from the ESN generator 400 to the CRC bit generator 410. Thereafter, the first switch 432 is switched to traffic information input node to input traffic information to the CRC bit generator 410. If the ESN information and traffic information are input to the CRC bit generator 410 in this manner, the CRC bit generator 410 calculates CRC bits for the input signals, and upon completion of CRC bit calculation for every input bit, first outputs the input bits, and then outputs, the 16 CRC bits.

When the CRC bit generator 410 starts outputting the input bits, a second switch 434 connects the CRC bit generator 410 to a convolutional encoder 420 so that the output bits of the CRC bit generator 410 are input to the convolutional encoder 420. Here, the convolutional encoder 420 uses a coding rate R−¼. When the output bits of the CRC bit generator 410 are completely input to the convolutional encoder 420, the second switch 434 is switched to a tail bit generator 415 to input the tail bits to the convolutional encoder 420. The convolutional encoder 420 encodes the input bits. Upon completion of the encoding process, the encoded symbols are interleaved by an interleaver 451. The interleaved encoded symbols are input to a code repeater 461 symbol by symbol, where the input symbols are repeated 16 times.

Compared with the structure off FIG. 10, the structure of FIG. 8 is advantageous in that the codes are not deleted so that a signal can be transmitted with the high encoding performance. Information should be transmitted in a small amount, so that the 32-bit ESN number is compressed into 16 bits by using a hash function. Therefore, the same hash ID may be output for two different ESN numbers. When the different mobile stations using the same hash ID and the same slot transmit access messages. This is called a "collision", and there is a low probability that two mobile stations will use the same hash ID if the hash ID's are of sufficient length. If every mobile station uses a unique ID (or mobile station ID), however, collisions would not happen. As shown in the embodiment of FIG. 10, the ESN can be used for the terminal ID. Alternatively, an ID shorter in length than the ESN, temporarily scheduled to be used for a specific time in a specific area between the mobile station and the base station, can be used. In this case, it is possible to recognize the ESN which is the unique number of the mobile station, using only the ID of short length. The structure of FIG. 10 does not have a collision problem, since the ESN number is not hashed.

In practice, with regard to the type of an access channel message, the mobile communication system can employ either the message structure of FIG. 8 using the hash ID or the message structure of FIG. 10 using the ESN. The base station includes this information in access channel-related information and then sends it to the mobile station. The two messages having different structures are included in a frame having the same length. Therefore, the mobile station can select the two messages in another method, and the base station can determine the message type through rate determination.

A description will now he made regarding a method and procedure for constructing a message used when the base station assigns a reverse common channel in the case where the mobile station makes all RSMA access request.

Figure 12A:
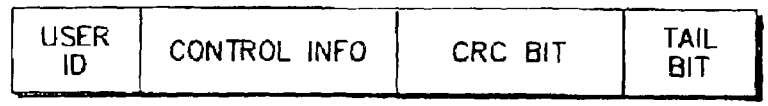
FIGS. 12A and 12B are diagrams illustrating the structure of a common assignment channel signal transmitted from a base station to a mobile station according to an embodiment of the present invention.
Figure 12B:
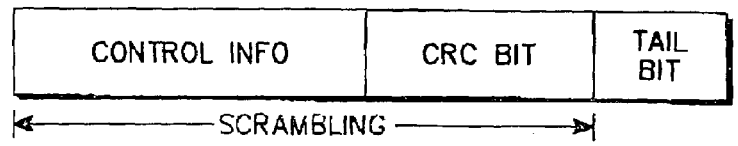

In the access procedure, the base station sends a channel assignment message to the mobile station over a common assignment channel. FIGS. 12A and 12B show the structure of a common assignment channel message used when the base station assigns a reverse common channel to the mobile station which has made an RSMA request. Referring to FIGS. 12A and 12B, there are shown three methods or constructing a common assignment channel signal, wherein a message frame of the common assignment channel has a length of 5 msec and a data rate of 9600 bps.

Referring to FIG. 12A, a common assignment channel message frame according to the first method is comprised of user ID, control information, CRC bits, and tail bits. In the message structure of FIG. 12A, the mobile station recognizes a message transmitted thereto through a user's unique number. The mobile station interleaves and decodes the received signal, and thereafter, examines the user ID to determine whether or not the received message has been transmitted to the mobile station itself. In this message constructing method, when the mobile station sends the base station a user's unique number such as the ESN for the user ID, the base station uses the terminal's unique number such as the ESN for the user ID of FIG. 12A. However, when the mobile station sends the base station a hash ID for the user ID, the base station uses the hash ID for the user ID of FIG. 12A.

Referring to FIG. 12B, a common assignment channel message frame according to the second method is comprised of control information, CRC bits, and tail bits. In this message structure, the control information is scrambled with a scrambling code. Here, the scrambling code can be either a mobile station's unique ID (i.e., ESN) or a hash ID. In this case, it is advantageous in that the user ID (hash ID or ESN) is not added to the channel assignment message. Therefore, it is possible to transmit the larger amount of control information with a message having the same length, and reduce a length of the channel assignment message in transmitting the same amount of control information.

There are several methods of scrambling the channel assignment message.

A first scrambling method is to scramble a message before encoding the message including the control message and CRC bits. The procedure for scrambling the message with the scrambling code is as follows. CRC is calculated for the control data to be transmitted. Thereafter, the transmission data and CRC bits are scrambled with a unique scrambling code according to the user ID (hash ID or mobile terminal's unique ID), and then the tail bits are added to the scrambled output. Thereafter, the scrambled message is encoded. Upon receipt of this message, the mobile station decodes and processes the received message in the following procedure. The mobile station decodes the received signal, and then descrambles the decoded signal with the same scrambling code as used in scrambling. As the result, when CRC is checked to be correct, the mobile station recognizes that the message has been transmitted to the mobile station itself, and follows the instructions of the message. However, when the CRC check fails, the mobile station judges hat the message has not been transmitted to the mobile station itself, and performs the next operation. It is possible to make a more reliable decision by combining the additional information of the decoder and the despreading energy value of the demodulator as well as the CRC result.

The forward common assignment channel can transmit other control messages such as an access control message other than the channel assignment message. In this case, the mobile station should be able to distinguish between the channel assignment message and the other control messages. To this end, the base station assigns a specific scrambling code to the access control message. The scrambling code used for the access control message is different from the scrambling code assigned to the channel assignment message. When the transmission message is the channel assignment message, the base station scrambles the message with a scrambling code corresponding to the mobile station ID before transmission. When the transmission message is the access control message, the base station scrambles the message with a specific scrambling code for the message before transmission. The mobile station performs descrambling and CRC checking two times, after decoding the received signal. That is, the mobile station first performs descrambling and CRC checking for the channel assignment message and then performs descrambling and CRC checking for the access control message. In this case, when CRC checking for the channel assignment message is made successfully, the mobile station judges that the channel assignment message has been received. When CRC checking for the access control message is made successfully, the mobile station judges that the access control message has been received.

A second scrambling method is to encode a message and CRC bits and then scramble the encoded results. That is, an encoded message generated from an encoder is interleaved by an interleaver, and scrambling can be performed before and after the interleaver. In the embodiment of the present invention, the encoded symbols are scrambled after the interleaver.

Figure 13:
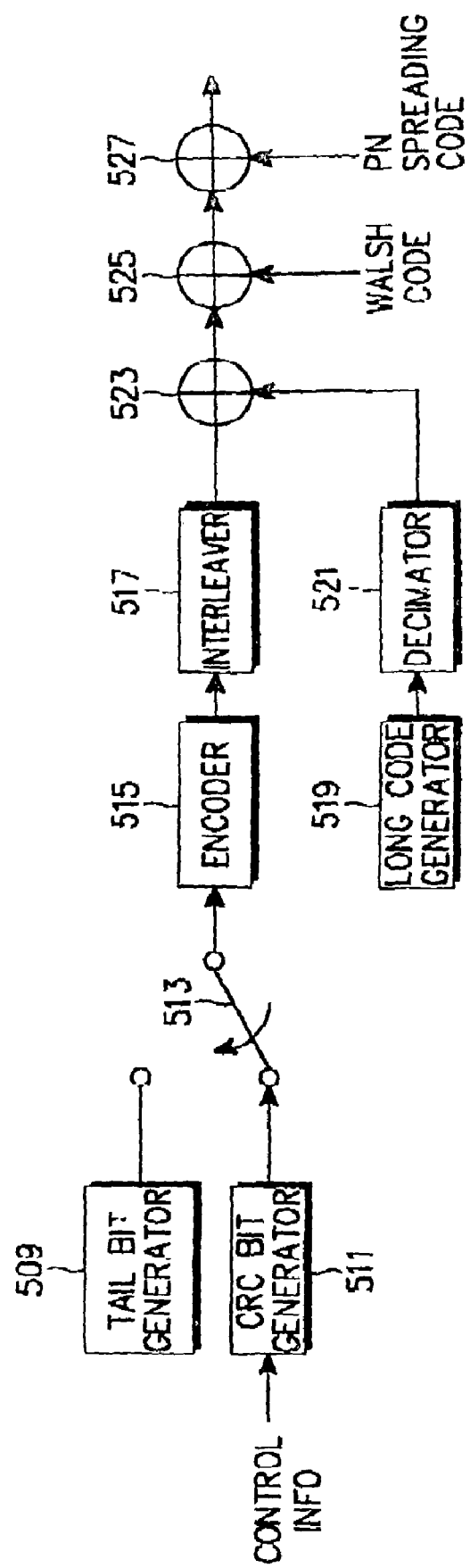
FIG. 13 is a block diagram illustrating a transmitter for a forward common assignment channel that performs scrambling after encoding.

FIG. 13 shows a transmitter for a forward common assignment channel, which performs scrambling after encoding.

Referring to FIG. 13 upon receipt of a control message not including a user ID, a CRC bit generator 511 calculates CRC of the control information and adds the calculated CRC to the input control information. A switch 513, under the control of a controller (not shown), selects an output of the CRC bit generator 511 or an output a tail bit generator 509. Here, the tail bits become information or terminating a frame upon complete receipt of the one-frame control information. An encoder 515 encodes frame information output from the switch 513. Here, an $R=\frac{1}{4}$ convolutional encoder is used for the encoder 515. An interleaver 517 interleaves the channel encoded data. A long code generator 519 generates a long PN code for scrambling the transmission information. A decimator 521 decimates the long PN code to match the size of the long PN code to the size of the interleaver 517. An adder (or exclusive OR operator) 523 performs exclusive OR operation for an output of the interleaver 517 and an output of the decimator 521. A first multiplier 525 multiplies an output of the adder 523 with a Walsh code to generate an orthogonally spread signal. A second multiplier 527 multiplies the orthogonally spread signal with a PN spreading code to generate a spread transmission signal.

With regard to operation of FIG. 13, the tail bits are added to the CRC-added message in the encoder 515, before encoding. The encoded data is interleaved by the interleaver 517. For scrambling, the interleaved data is exclusively ORed with the decimated long PN code which is a scrambling code. Long code is generated by long code mask. The long code mask is specified by unique code such as the hash ID or mobile station ID. For the scrambling code used herein, it is possible to use the long PN code decimated as shown in FIG. 13. The scrambled symbols are spread with the Walsh code and the PN spreading code, and transmitted over the forward link.

Figure 14:
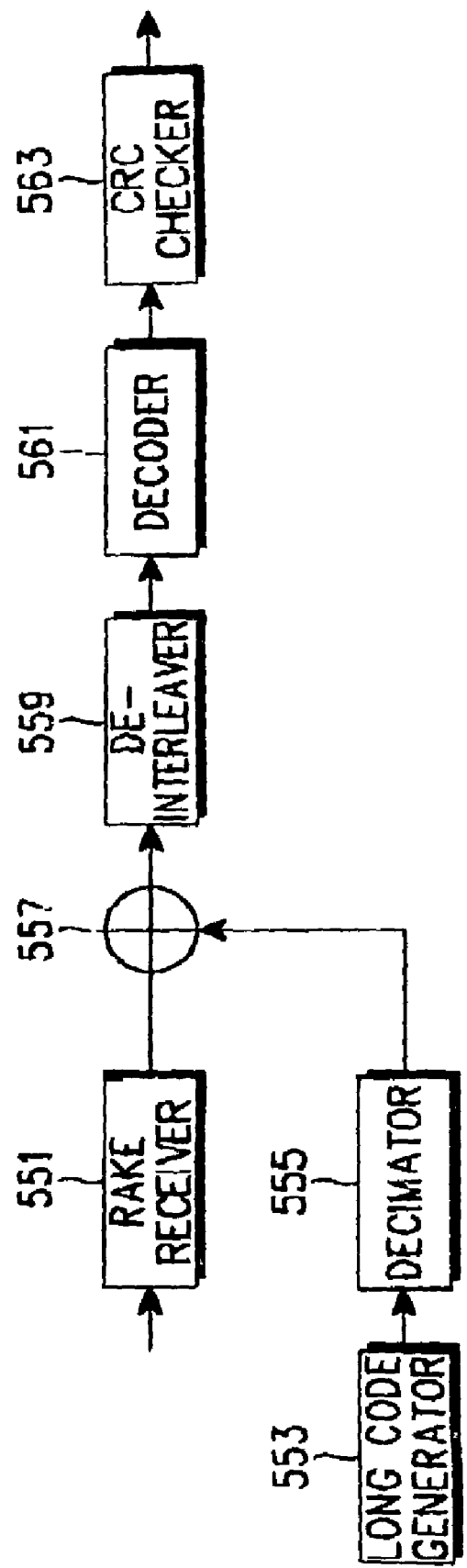
FIG. 14 is a diagram illustrating a method for enabling a mobile station to recognize its own message out of a received common assignment channel message which has been spread by the transmitter of FIG. 13.

FIG. 14 shows a method for enabling a mobile station to recognize it's own message out of a received common assignment channel message which has been spread by the transmitter of FIG. 13.

Referring to FIG. 14, a Rake receiver 551 has the function of PN despreading and orthogonally despreading a signal received through an antenna. A long code generator 553 generates the same long PN code as that of the receiving side. A decimator 555 decimates the long PN code to match the chip rate of the long PN code to the symbol rate of the Rake receiver 551 output. For descrambling, an adder 557 performs an exclusive OR operation for an output of the Rake receiver 551 and an output of the decimator 555. A deinterleaver 559 deinterleaves a signal output from the adder 557. A decoder 561 decodes the deinterleaved data. A CRC checker 563 performs CRC checking for the decoded data.

With regard to operation of FIG. 14, the received message is demodulated to combine multipath components in rake receiver 551, and then descrambling is performed. A code used herein is a scrambling code used when the transmitter transmits a message to the mobile station. The received signal descrambled by the adder 557 is deinterleaved by the deinterleaver 559 and then decoded by the decoder 561. CRC checking is performed for the decoded message by the CRC checker 563. As the result, when CRC checking is made successfully, the mobile station declares that the message has been transmitted to the mobile station itself. However, when CRC checking is failed, the mobile station declares that the message has not been transmitted to the mobile station. In addition, it is possible to use additional information such as reliability information output from the encoder in determining whether or not the message has been transmitted to the mobile station itself.

The forward assignment channel can transmit other control messages such as an access control message other than the channel assignment message. In this case, the mobile station should be able to distinguish between the channel assignment message and the other control messages. To this end, the base station assigns a specific scrambling code to the access control message. The scrambling code used for the access control message is not assigned for the scrambling code for the channel assignment message. When the transmission message is the channel assignment message, the base station scrambles the message with a scrambling code corresponding to the user ID which is received from the mobile station before transmission. When the transmission message is the access control massage, the base station scrambles the message with a specific scrambling code for the message before transmission.

Then, the mobile station performs descrambling, decoding and CRC checking two times for the received signal. That is, the mobile station first performs descrambling, deinterleaving, decoding and CRC checking for the channel assignment message using the scrambling code according to the user ID, and then performs descrambling, deinterleaving, decoding and CRC checking for the access control message using the designated specific scrambled code. In this case, when CRC checking for the channel assignment message is made successfully, the mobile station judges that the channel assignment message has been received. When CRC checking for the access control message is made successfully, the mobile station judges that the access control message has been received. In this process, the mobile station requires to perform descrambling, deinterleaving, decoding and CRC checking two times.

The embodiments of FIGS. 13 and 14 can be modified. That is, in the embodiment of FIG. 13, the order of the interleaver and the scrambler can be inverted and in the receiver of FIG. 14, the order of the deinterleaver and the descrambler can be inverted.

A third method of constructing a common assignment channel is to transmit a part or the full part of the user ID (hash ID or mobile station ID) by scrambling. The scrambling operation is equal to that described in the above two scrambling methods. However, this method further includes the process of checking a part or the full part of the user ID after CRC checking. That is, the mobile station recognizes that the message has been transmitted to the mobile station itself, only when a part or the full part of the user ID is identical after CRC checking. For example, for the hash ID, the mobile station transmits the full hash ID without scrambling; for the ESN, the mobile station includes 16 bits of the ESN in the message and performs scrambling before transmission. This is advantageous in that the same message structure can be used for two structures. Further, this can be used in detecting an error message out of CRC checking-passed messages. In the third common assignment channel structure, it is possible to use a specific field scheduled between the transmitter and the mobile station, instead of a part or the full part of the user ID. The scheduled filed also can be used in increasing a reliability of the message after CRC checking.

Figure 15A:
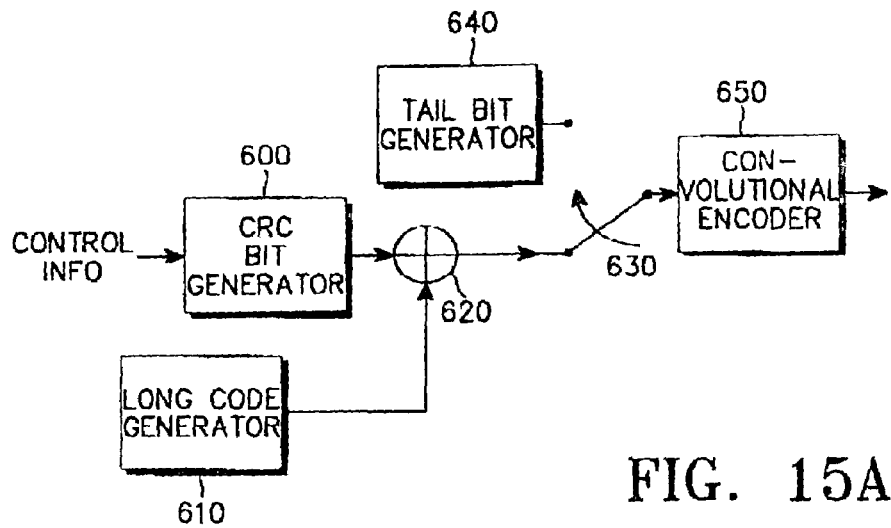
FIG. 15A is a block diagram illustrating a device for constructing common assignment channel signals shown in FIGS. 12A and 12B.

FIG. 15A is a block diagram illustrating a device for constructing common assignment channel signals shown in FIGS. 12A and 12B.

Referring to FIG. 15A, control information is input to a CRC bit generator 610 on a bit-by-bit basis. The CRC bit generator 610 then calculates CRC for the control information and outputs the control information and CRC bits. At the same time, a long code generator 600 generates a long PN code bit by bit. For scrambling, the long PN code is exclusively ORed with the output of the CRC bit generator 600 by an adder (or exclusive OR operator) 620. When the adder 620 start outputting the input bits, a switch 630 connects the adder 620 to a R=¼ convolutional encoder 650 to input the output of the adder 620 to the convolutional encoder 650. After completion of inputting the data bits, the switch 630 is switched to a tail bit generator 640 to input the tail bits to the convolutional encoder 650. The convolutional encoder 650 then encodes the input bits.

Figure 15B:
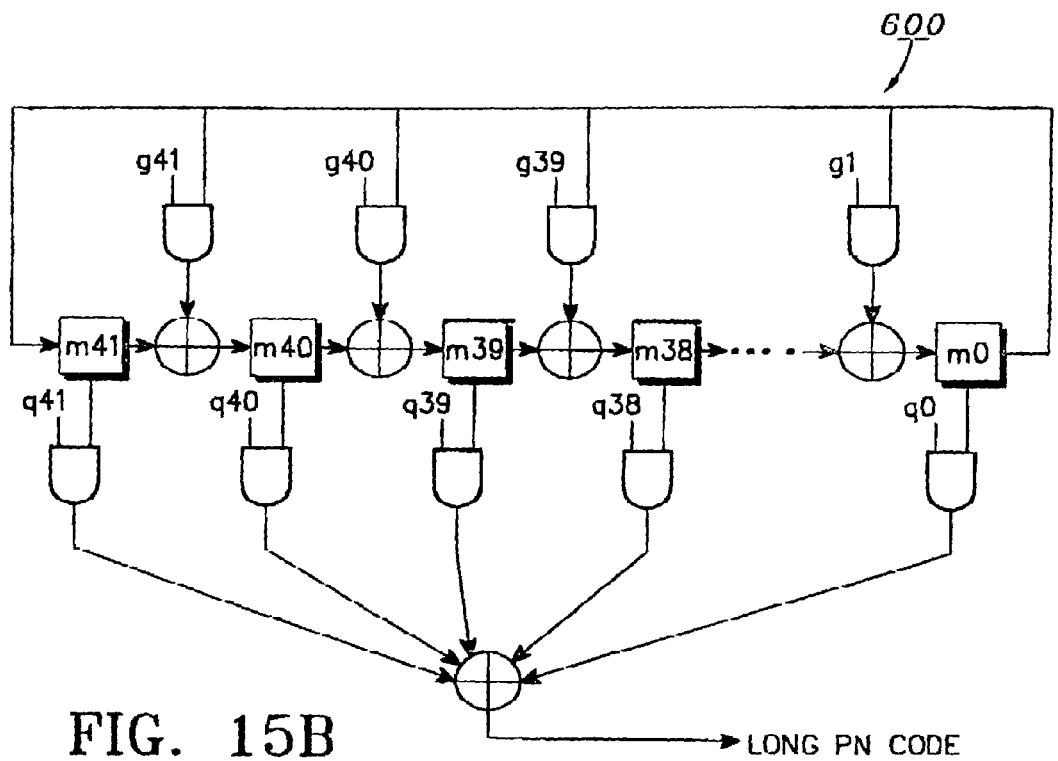
FIG. 15B is a detailed diagram illustrating a long code generator of FIG. 15A.

FIG. 15B shows the long code generator 600. The structure of the long code generator 600 is well known in the art. Therefore, a detailed description of the long code generator will be avoided herein.

Referring to FIG. 15B, masks q0-q41 are generated using a user ID of an access channel message that the base station has received from the mobile station over all access channel. In FIG. 15B, a long code generator structure is shown. The shift registers m0, . . . , m41 stores the current state of the generator and connection of the generator is controlled by the control signal g1, . . . , g41 for a specific generator polynomial. The final output of the long code generator is made from the XOR logic whose inputs are some of the shift registers. The selection of the XOR inputs are controlled by q0, . . . q41. The long code generator output $2^{42}-1$ length periodic code. As described above, the user ID can be either a hash ID or a mobile station ID such as the ESN. Therefore, the long PN code can be divided into two types according to the user information type. It is also possible to use separate long code generators by having a generator polynomial for a long PN code used when the user ID is the hash ID be different from a generator polynomial used when the user ID is the mobile station ID.

When the hash ID is used, the base station cannot know an exact unique number of the mobile station user. Therefore, for user identification, the mobile station should use a long PN code and for communication, the mobile station and the base station both should have the same user information. However, the base station has only the hash ID which is not the exact unique number of the mobile station user. Therefore, the number of the common control channels is smaller than the number of the users. In the embodiment of the present invention, the above long PN code will be referred to as a public long code.

When using the mobile station ID such as the ESN, the base station can know an exact unique number of the mobile station user. In the embodiment of the present invention, the above long PN code will be referred to as a public long code. Therefore, since the base station uses the long PN code for user identification, and the mobile station and the base station both do not have complete user information for communication, the number of the common control channels can be equal to the number of users.

When the access request message transmitted from the mobile station to the base station sends, as the unique user ID, the ESN or a short ID which is uniquely appointed between the base station and the mobile station, the ESN number which is the mobile station ID is used for the user ID. Further, when the access request message transmitted from the mobile station to the base station sends the hash ID as the user ID, the hash ID is used for the user unique number.

When the access request message transmitted from the mobile station to the base station sends the hash ID for the user unique number, the base station and the mobile station use the public long code and the number of available common control channels is limited. Further, when the access request message transmitted from the mobile station to the base station sends the ESN which is the unique user ID, or the mobile station ID which is the short ID appointed between the base station and the mobile station, the base station and the mobile station use the public long code and the number of available common control channels becomes equal to the number of the users.

In an embodiment of the present invention, the reverse common channel refers to a channel assigned such that the mobile station can transmit a signal for a predetermined time without collision through a channel assignment command. At this point, channel separation can be performed using a spreading code used by the mobile station. The base station can use a scheduled mode in which the base station includes a plurality of reverse channel and assigns one of the channels to the mobile station.

In addition, when the mobile station sends an access request to the base station by sending the ESN or the mobile station ID such as the short ID appointed between the mobile station and the base station, it is possible to completely avoid a collision by assigning a unique channel to the mobile station. Using such a channel is called a designated mode.

Power Control Method

Korean patent application No. 98-10394 filed by the applicant discloses (1) a method in which the base station controls transmission power of a reverse common channel by designating a reverse channel by request of the mobile station, (2) a method in which the base station controls transmission power of the reverse channel by designating a reverse channel with which the mobile station will respond, and (3) a method for controlling transmission power of the reverse channel transmitted by the mobile station in the existing slotted Aloha method. The following description can be applied to not only the above three power control methods, but also every other method for controlling transmission power of the reverse common channel.

Figure 1:
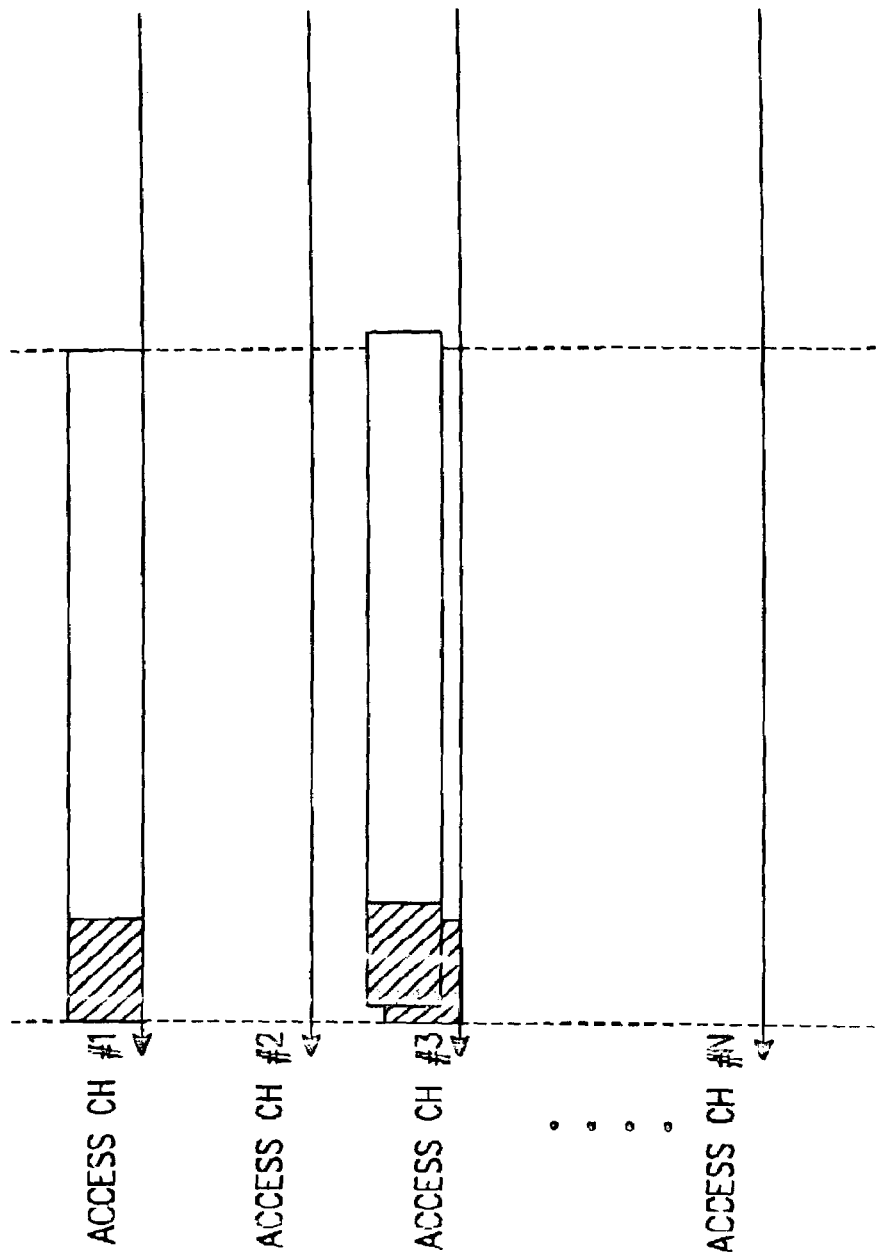
FIG. 1 is a diagram illustrating access messages transmitted by a plurality of mobile stations using a slotted Aloha method.
Figure 2B:
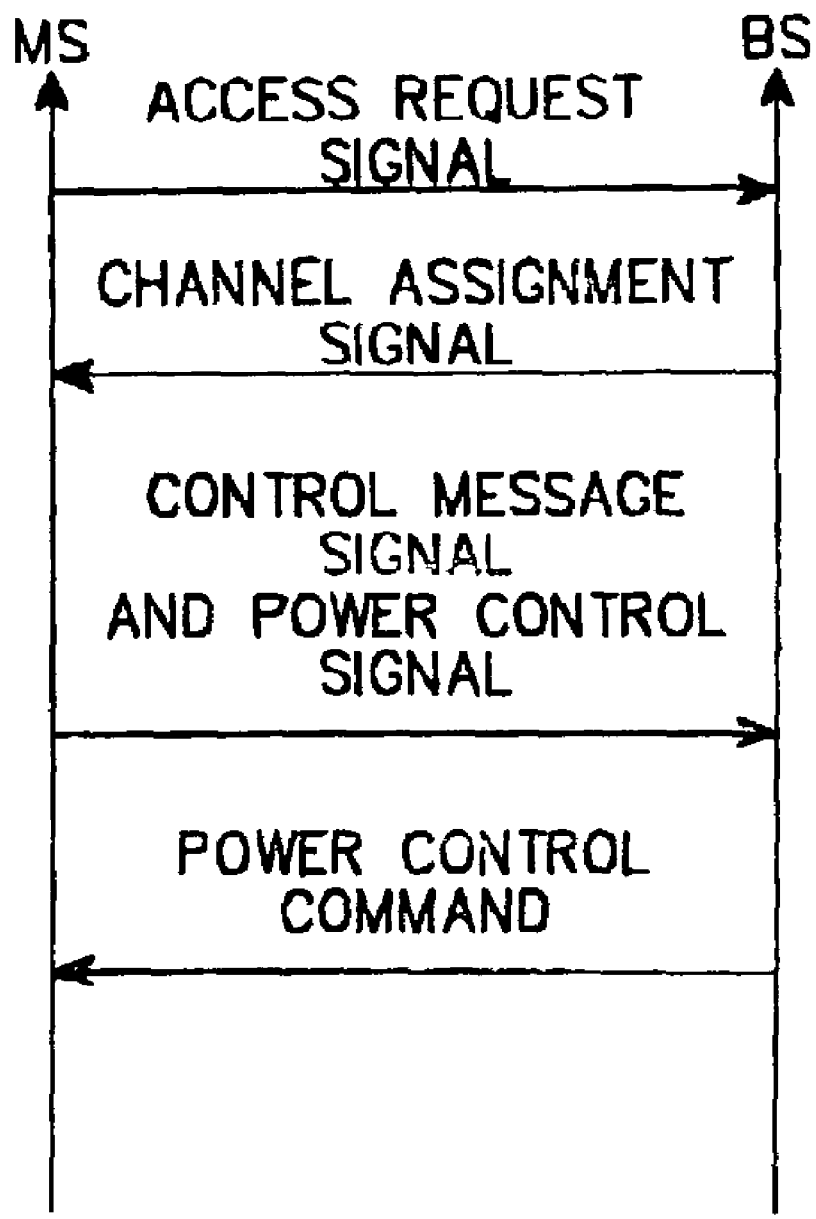
FIG. 2B is a diagram illustrating a signal flow between a base station and a mobile station in accordance with the procedure of FIG. 2A.

Referring to FIG. 2A, the common control channel performs forward and reverse power control. When a call is not set up because the base station fails to receive a preamble over the common control channel, it is preferable that the mobile station releases the call, because continuous transmission of the preamble to the base station will cause an increase in channel interference. The embodiment of the present invention provides two methods for effectively releasing the call when the base station has failed to acquire the preamble, and a power control method.

Figure 16:
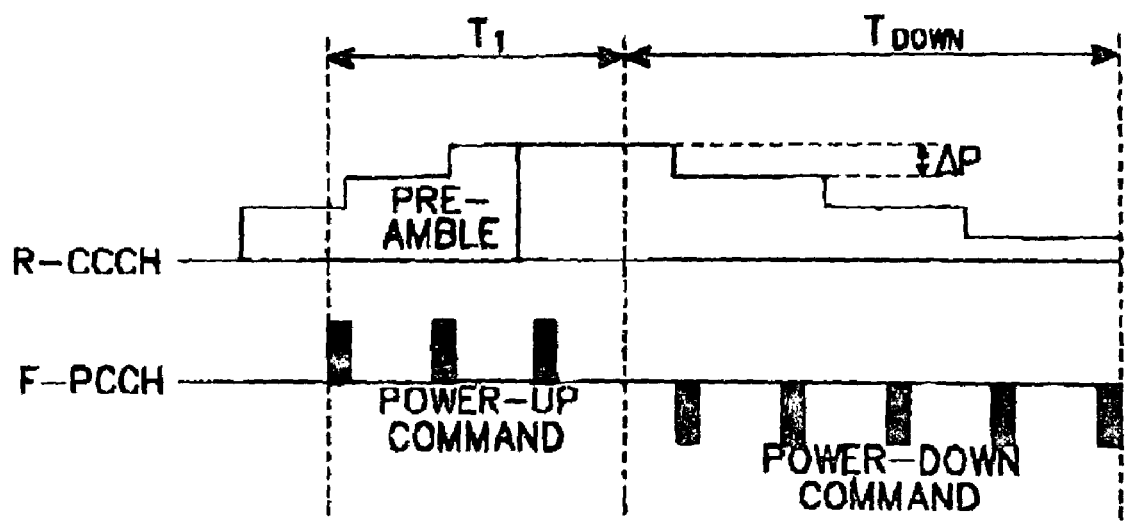
FIG. 16 is a diagram for explaining a first reverse power control method for releasing a call in a mobile communication system according to an embodiment of the present invention.

The first method performs initial power control for the duration where an initial preamble is transmitted as in the existing method. FIG. 16 shows the first power control method. When the reverse channel signal transmitted by the mobile station has low power so that the base station fails to acquire the signal, the base station sends a power-up commands to the mobile station for a time $T_1$ or until the reverse channel signal is acquired over a forward power control channel (F-PCCH). The mobile station then controls transmission power of a reverse common control channel (R-CCCH) according to the power control command transmitted from the base station. The signal transmitted by the mobile station can be a preamble, as disclosed in Korean patent application No. 98-14276, filed by the applicant. When the base station fails to acquire the preamble transmitted from the mobile station over the reverse common control channel R-CCCH within the time $T_1$, the base station performs a call release procedure for a predetermined time $T_{down}$. In the call release procedure, the base station transmits power-down commands over the forward power control channel F-PCCH, and the mobile station decreases transmission power of the reverse common control channel according to the power-down commands from the base station. In the power control process for the reverse common control channel, $T_1$ or $T_{down}$ can be zero (0).

In the above call release procedure, the base station continuously sends the power-down commands over the forward power control channel F-PCCH for the time $T_{down}$. The mobile station then decreases transmission power of a signal transmitted over the reverse common control channel R-CCCH according to the power-down commands received for the time $T_{down}$ over the forward power control channel F-PCCH. In this manner, the base station continuously sends the power-down commands for the time $T_{down}$, and then sends no more power control command over the power control channel. The mobile station then releases the call if the signal level is lower than a threshold or the forward channel is in a bad condition, while controlling transmission power of the reverse common control channel R-CCCH according to the power control commands received over the forward power control channel F-PCCH. Here, the signal level refers to a value obtained by measuring power of power control bits for a predetermined time.

Figure 17:
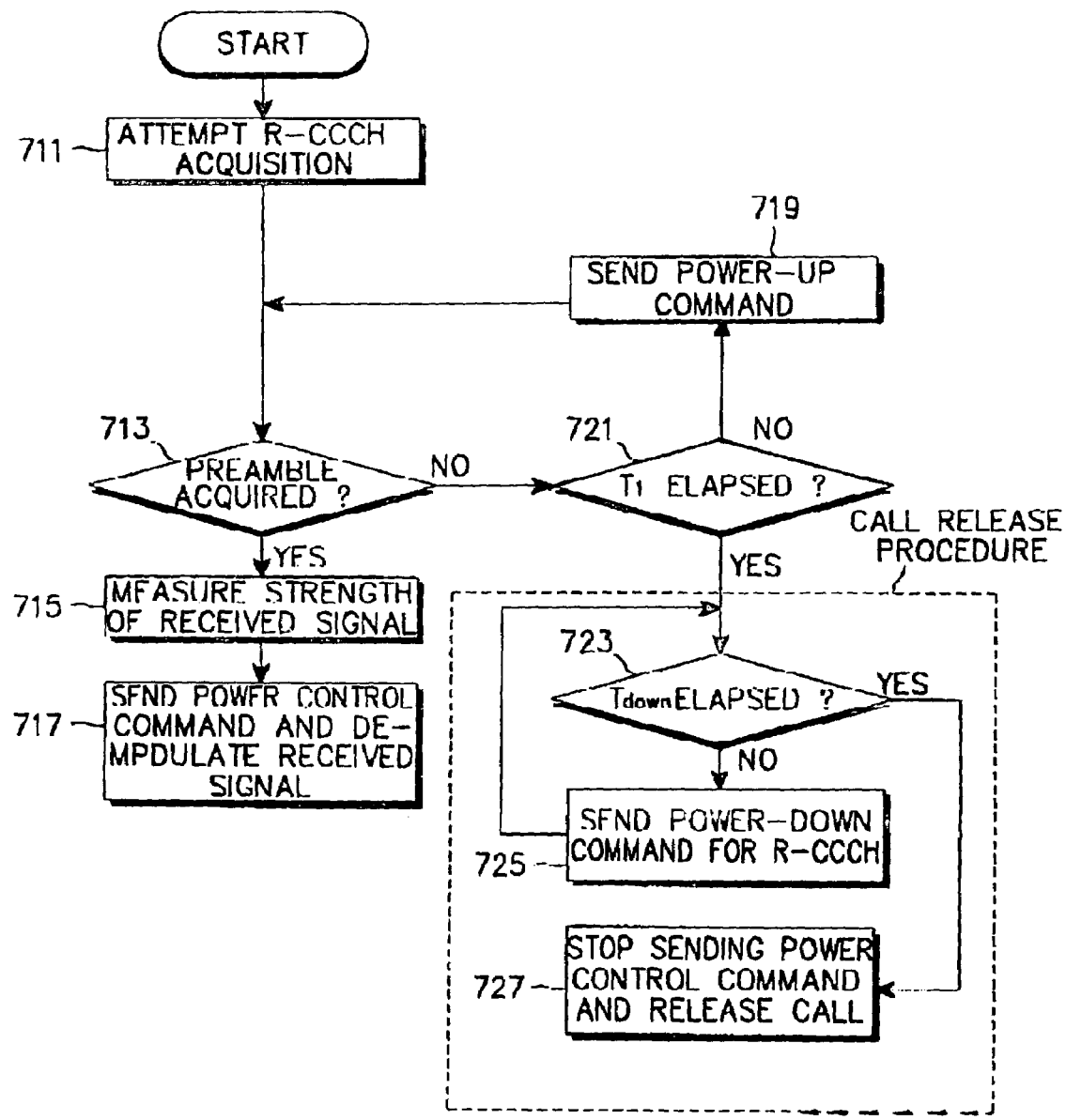
FIG. 17 is a flow chart illustrating a procedure for performing the first power control method in a base station.
Figure 18:
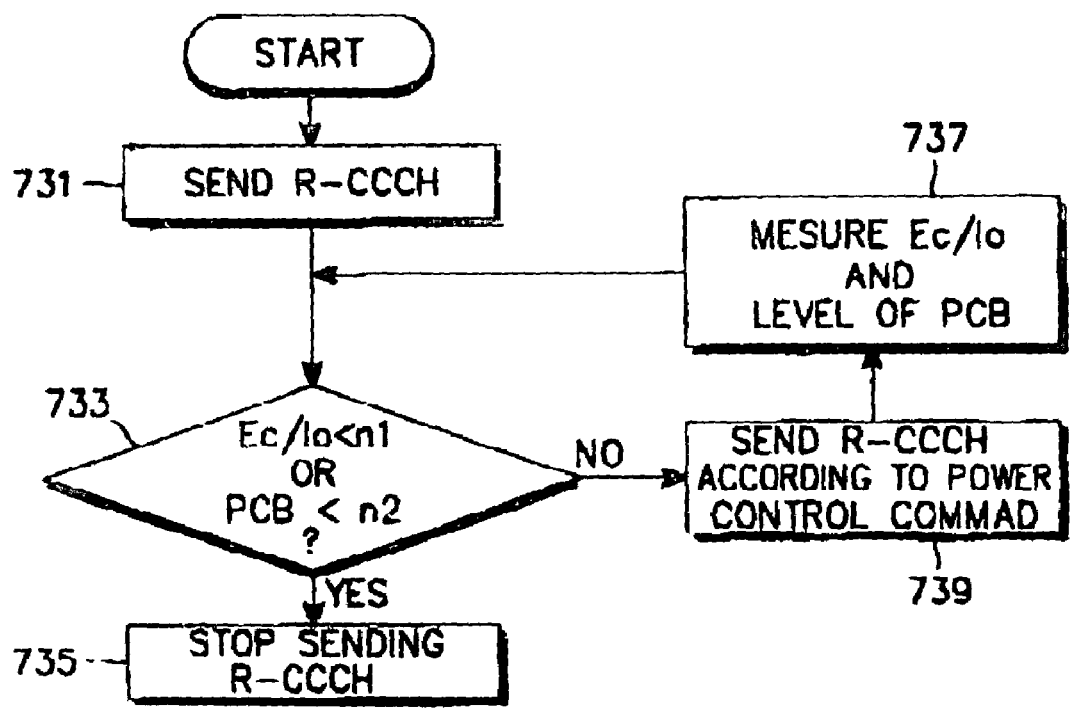
FIG. 18 is a flow chart illustrating an additional procedure for performing the first power control method in a mobile station.

FIG. 17 shows a power control method performed in the base station according to the first method, and FIG. 18 shows a procedure in which the mobile station controls transmission power of the reverse common control channel according to the power control commands transmitted from the base station.

Referring to FIG. 17, after attempting acquisition of the reverse common control channel R-CCCH in step 711, the base station repeatedly performs steps 713, 721 and 719 to transmit power-up commands over the forward power control channel F-PCCH for the time $T_1$ shown in FIG. 16. Upon acquisition of a preamble during transmission of the power-up commands, the base station detects the acquisition of a preamble in step 713 and continuously performs steps 715 and 717 where the base station measures strength of the received signal to continuously perform power control and demodulates the received signal. However, upon failure to detect a preamble within the time $T_1$, the base station detects this in step 721 and continuously performs steps 723 and 725 to output a power control command for the call release procedure. In the call release procedure, the base station transmits the power-down commands over the forward power control channel for the time $T_{down}$ shown in FIG. 16 and, after a lapse of the time $T_{down}$, stops transmission of the power control commands and releases the call in step 727.

Referring to FIG. 18, after transmitting a message over the reverse common control channel R-CCCH in step 731, the mobile station repeatedly performs steps 733, 739 and 737 where the mobile station controls transmission power of a signal transmitted over the reverse common control channel R-CCCH according to the power control command received over the forward power control channel F-PCCH, and measures Ec/Io and a level of the power control bit to update. The transmission power of the signal transmitted over the reverse common control channel R-CCCH is controlled through the above process, and the power control commands transmitted from the base station are received as shown in FIG. 16. At this point, while controlling transmission power of the reverse common control channel R-CCCH according to the power control command received over the forward power control channel F-PCCH, if the signal level (Ec/Io of the pilot channel, which is a value obtained by measuring power of the power control bits for a predetermined time) is lower than a threshold or the forward channel is in a bad condition, the mobile station detects this in step 733 and stops transmission of the reverse common control channel R-CCCH to release the call in step 735.

Figure 19:
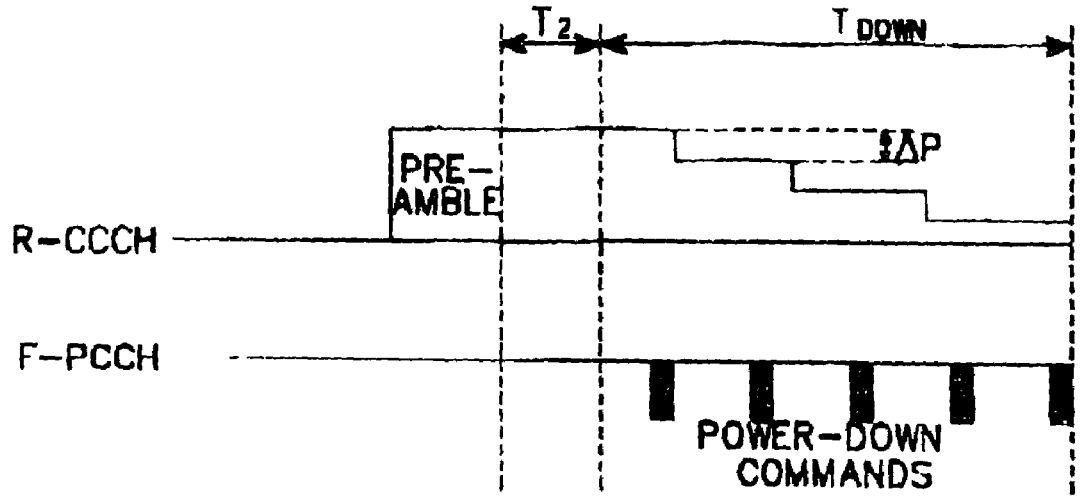
FIG. 19 is a diagram for explaining a second reverse power control method for releasing a call in a mobile communication system according to an embodiment of the present invention.

In the second method, upon failure to acquire the preamble, the base station immediately starts the call release procedure. FIG. 19 shows the second power control method.

FIG. 19 shows a situation where the base station fails to acquire a preamble transmitted from the mobile station over the reverse condition control channel R-CCCH. Referring to FIG. 19, the base station has a threshold for determining whether the preamble of the reverse common control channel is received or not. The base station receives the preamble over the reverse common control channel R-CCCH. In this state, the base station compares the preamble received over the reverse common control channel R-CCCH with the threshold for a predetermined time $T_2$. When strength of the received signal is lower than the threshold, the base station judges that the preamble signal is not received, and transmits power-down commands over the forward power control channel F-PCCH for a time $T_{down}$. After a lapse of the time $T_{down}$, the base station transmits no more power control command over the forward power control channel F-PCCH. The mobile station then decreases transmission power of the reverse common control channel R-CCCH according to the power-down commands received for the time $T_{down}$, and releases the call when the signal level is lower than a predetermined level or the forward channel is in a bad condition. $T_2$ and $T_{down}$ used in the power control process can be zero.

Figure 20:
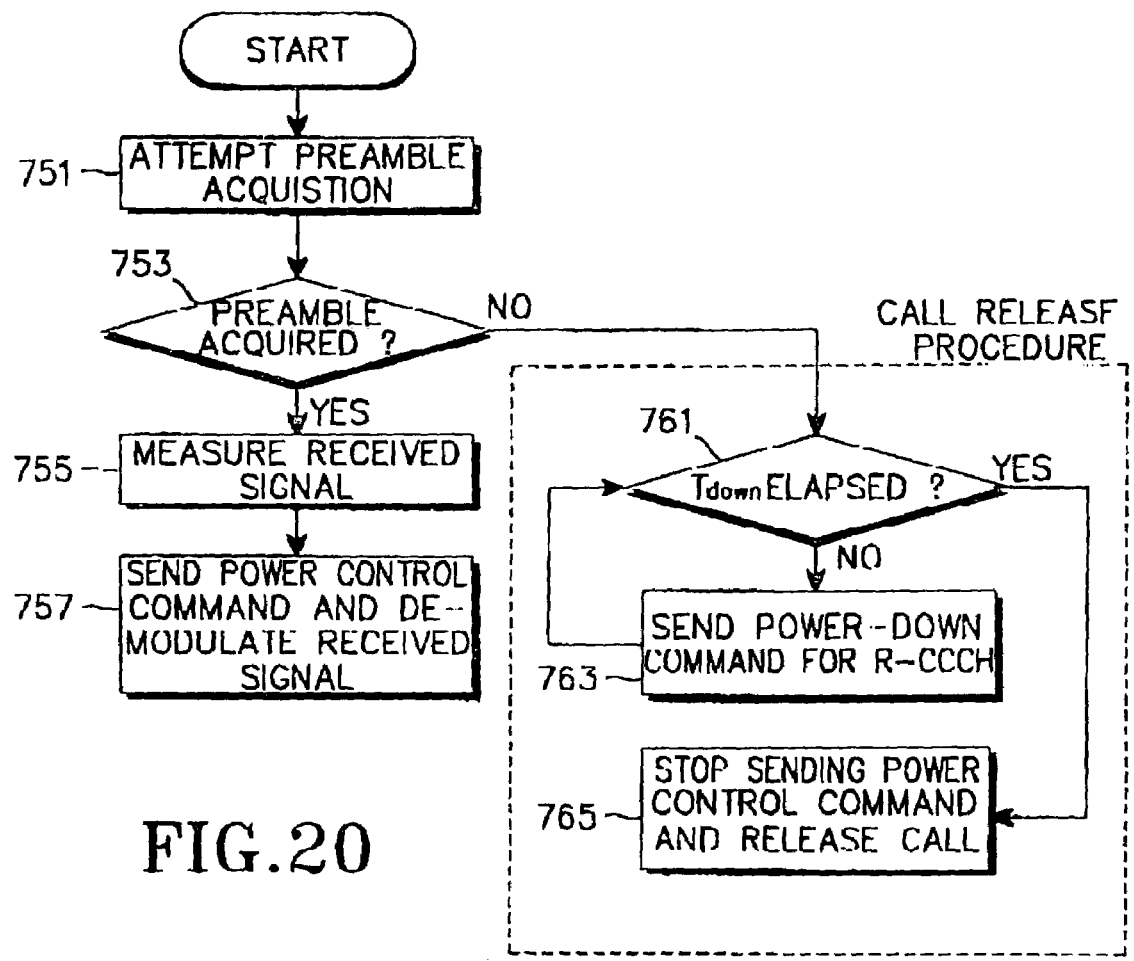
FIG. 20 is a flow chart illustrating a procedure for performing the second power control method in a base station.

FIG. 20 shows a power control procedure performed in the base station according to the second power control method. Further, a procedure in which the mobile station controls transmission power of the reverse common control channel according to the power control command transmitted from the base station, is performed as shown in FIG. 18.

Referring to FIG. 20, after attempting acquisition of the reverse common control channel R-CCCH in step 751, the base station compares, in step 753, a threshold with strength of a signal received over the reverse common control channel R-CCCH for the time $T_2$, to determine whether a preamble is acquired or not. When the preamble is acquired (i.e., when strength of the received signal is higher than the threshold), the base station detects this in step 753 and continuously performs steps 755 and 757 where the base station measures strength of the received signal to continuously perform power control and demodulates the received signal. However, upon failure to detect a preamble within the time $T_2$, the base station detects this in step 753 and continuously performs steps 761 and 763 to output a power control command for the call release procedure. In the call release procedure, the base station transmits the power-down commands over the forward power control channel for the time $T_{down}$ shown in FIG. 19 and, after a lapse of the time $T_{down}$, stops transmission of the power control commands and releases the call in step 765.

Referring to FIG. 20, there is shown a power control method where two or more mobile stations send access channel request frames including power control bits over the same access channel. In this situation, the base station recognizes (or acknowledges) a control signal transmitted from only one of the mobile stations. At this point, the base station transmits a power control command for the recognized mobile station over the forward power control channel F-PCCH, and the two mobile stations both can receive the power control command. In this case, the unrecognized mobile station will mis-recognize the power control command transmitted from the base station for a power control command for its own. Thus, the unrecognized mobile station will mistakenly control transmission power of the reverse common control channel according to the power control command transmitted from the base station. Since power control for the reverse common control channel R-CCCH by the unrecognized mobile station may cause an increase in channel interference to the normally operating mobile stations, it is necessary to control interference of the unrecognized mobile stations.

Figure 21:
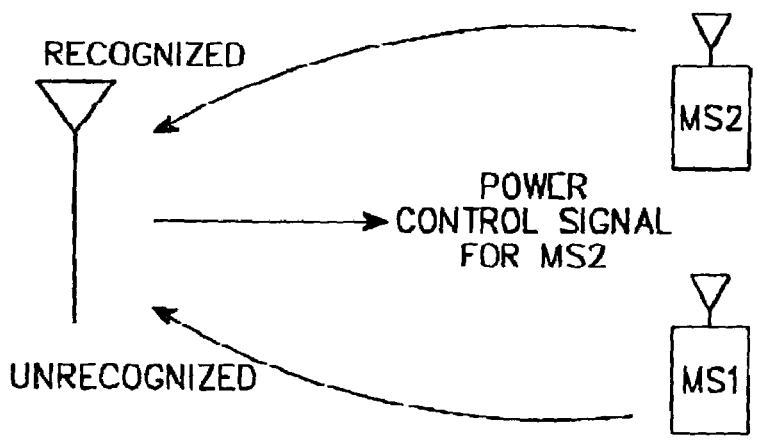
FIG. 21 is a diagram for explaining a situation occurring when two mobile stations send control messages to a base station over the same common control channel.
Figure 22:
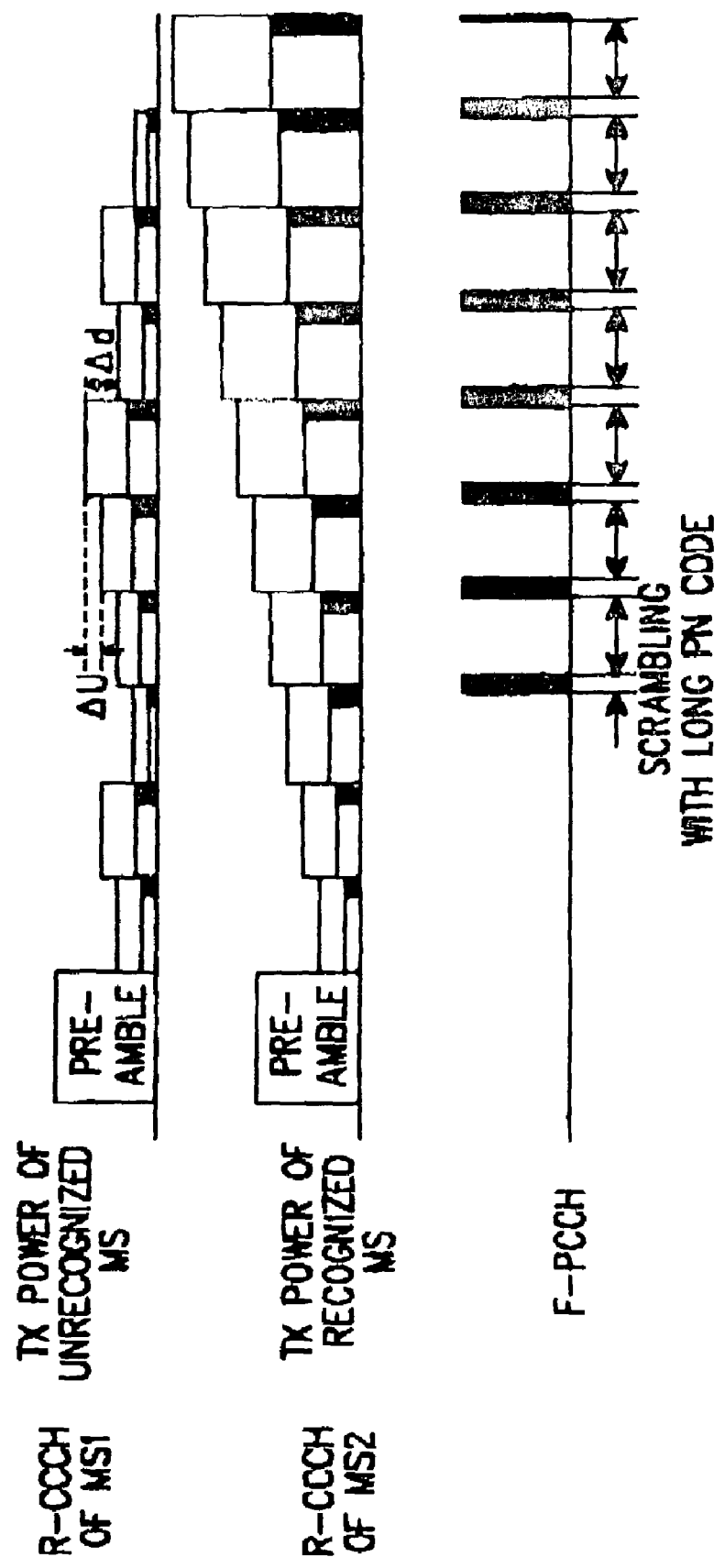
FIG. 22 is a diagram for explaining a reverse power control method performed in the situation of FIG. 21 according to an embodiment of the present invention.

Referring to FIG. 22, there is shown a power control method for the two mobile stations according to the situation of FIG. 21. R-CCCH of MS1 shows a method for controlling transmission power of the reverse common control channel for the unrecognized mobile station MS1, and R-CCCH of MS2 shows a method for controlling transmission power of the reverse common control channel for the recognized mobile station MS2. In FIG. 22, F-PCCH shows a method for transmitting power control commands over the forward power control channel of the base station.

Referring to FIG. 22, the base station generates a long PN code for the user of the recognized mobile station MS2, scrambles a power control command for the reverse common control channel of the recognized mobile station using the generated long PN code, and transmits the scrambled power control command over the forward power control channel F-PCCH. In addition, a mobile station which is not assigned a channel due to an CRC error can attempt transmission of a reverse channel. Even in this case, the above control is required. Further, in the case where it is required to release the reverse channel while performing power control after assignment of the reverse channel, if the base station does not send the power control command, the mobile station will operate incorrectly and increase the amount of interference in the reverse link.

Figure 23:
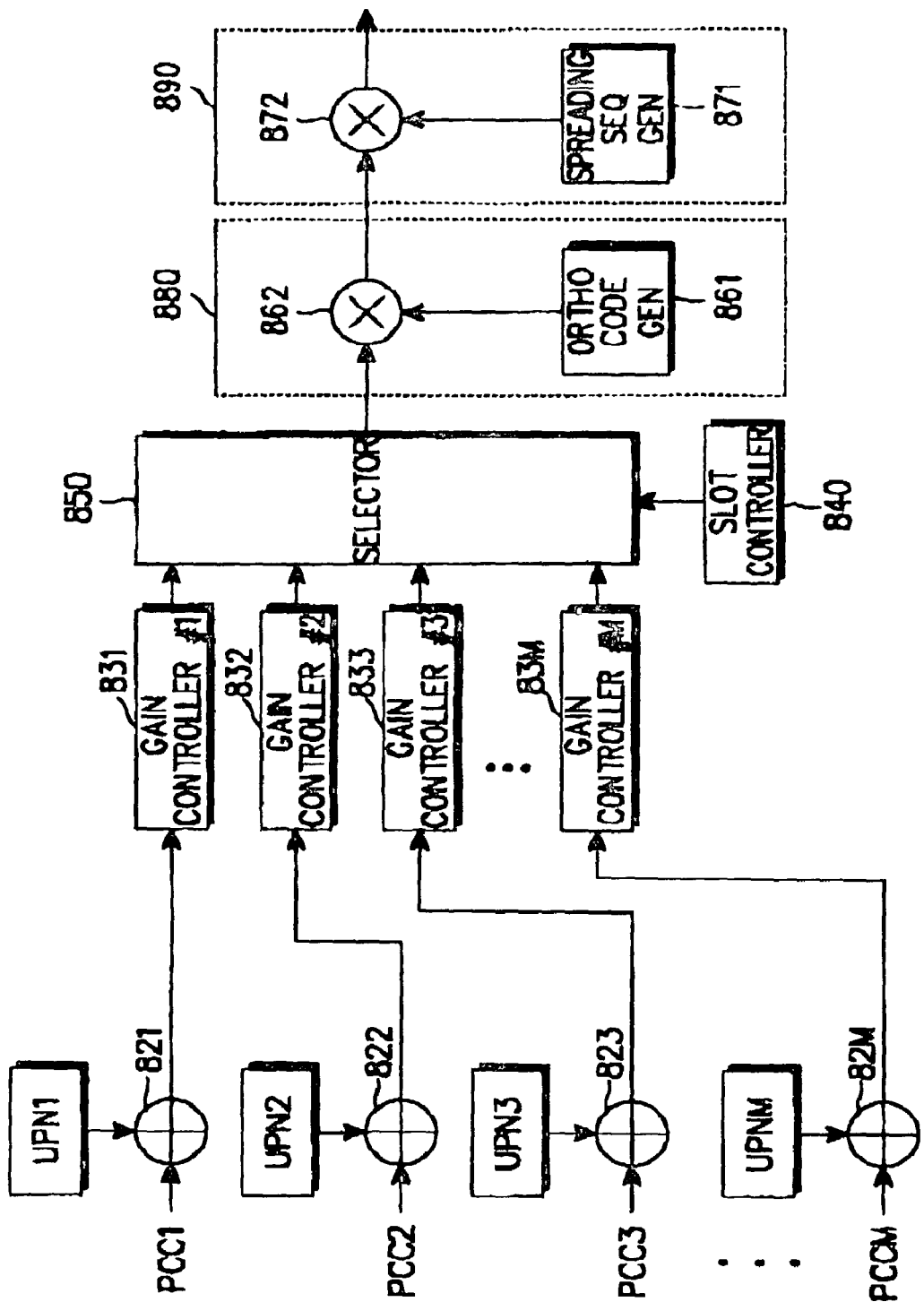
FIG. 23 is a block diagram illustrating a shared power control channel transmitter for transmitting power control information in a mobile communication system.

FIG. 23 shows the structure of the forward power control channel F-PCCH of the base station which performs power control as shown in FIG. 22. The power control channel shown in FIG. 23 is assumed to have a shared power control channel structure in which transmission power of several mobile stations is controlled using a single channel.

Referring to FIG. 23, power control commands PCC1-PCCM transmitted to respective users are scrambled with user's long PN codes UPN1-UPNM. Adders (or exclusive OR operators) 821-82M exclusively OR the power control commands PCC1-PCCM with their associated user's long PN codes UPN1 UPNM, to generate scrambled power control commands.

The power control commands transmitted to the respective users are multiplied by different gains. Gain controllers 831-83M control the power control commands output from the adders 821-82M according to associated gain control signals, respectively.

Locations of power control commands assigned to the forward shared power control channel can be fixed, or the locations of the power control commands can be varied every power control group (PCG) to make the spectrum uniform. In FIG. 23, a slot controller 840 generates a control signal for determining slot positions where power control commands output through the shared power control channel are inserted. The slot controller 940 includes a slot hopping pattern look-up table and generates a control signal for designating time slots where the power control commands for the respective users are inserted, consulting the slot hopping pattern look-up table.

A selector 850 multiplexes the gain-controlled power control commands PCC1-PCCM according to a select signal output from the slot controller 840. That is, the selector 850 receiving the power control commands PCC1-PCCM being transmitted over the shared power control channel, selectively outputs the power control commands to the shared power control channel under the control of the slot controller 840. A multiplexer can be used for the selector 850.

An orthogonal modulator 880 is comprised of an orthogonal code generator 861 and a multiplier 862. The orthogonal code generator 861 generates an orthogonal code for orthogonally modulating the power control commands transmitted over the shared power control channel, and the multiplier 862 multiplies the orthogonal code by the scrambled power control commands for the respective users, output from the selector 850. That is, the orthogonal modulator orthogonally modulates the power control commands for the several users using one orthogonal code and outputs the orthogonally modulated power control commands to the shared power control channel.

A sequence spreader 890 is comprised of a spreading sequence generator 871 and a multiplier 872. The spreading sequence generator 871 generates a spreading sequence for spreading the orthogonally modulated signal. The multiplier 872 multiplies the orthogonally spread signal by the spreading sequence to spread the power control commands and outputs the spread power control commands over the shared power control channel. Here, although the orthogonal modulator and the spreader have a BPSK (Binary Phase Shift Keying) structure, they can also have a QPSK (Quadrature Phase Shift Keying) structure. In this case, the power control commands output from the selector 850 are demultiplexed into odd-numbered power control commands and even-numbered power control commands. The odd-numbered power control commands are output to a first channel and the even-numbered power control commands are output to a second channel. Thereafter, the odd-numbered power control commands and the even-numbered power control commands separately undergo orthogonal modulation and spreading modulation.

Referring to FIG. 23, the power control commands transmitted to the respective subscribers over the shared power control channel are scrambled with their associated user's long PN codes UPN1-UPNM, and the scrambled power control commands are provided to their associated gain controllers 831-83M. However, the method for scrambling the power control commands with the user's long codes is optional. In this case, the power control commands PCC1-PCCM are directly input to their associated gain controllers 831-83M. The gain controllers 831-83M then multiply the input power control commands by different gains and provide their outputs to the selector 850.

The slot controller 840 designates time slots for arranging the power control commands to be transmitted to the respective subscribers on the shared power control channel. That is, as shown in FIG. 2A, the slot controller 840 assigns the location of each power control command every power control group PCG. The locations of the power control commands can be either fixed or varied every power control group PCG. In the embodiment of the present invention, the slot controller 840 includes the slot hopping pattern look-up table and variably designates inserting locations of the power control commands for the respective users. Then, the selector 850 receiving the power control commands output from the gain controllers 831-83M, assigns the power control commands to the predetermined locations according to the control signal output from the slot controller 840.

The generated power control commands for the shared power control channel are multiplied by the orthogonal code in the multiplier 862, for orthogonal modulation, and multiplied again by the spreading sequence in the multiplier 872, for spreading.

The used long PN code is the public long code in the structure where the hash ID is used for the user ID, and the used long PN code is the private long code in the structure where the ESN which is the user's unique number is used for the user ID. The mobile stations perform power control depending on the power control commands transmitted from the base station over the power control channel, wherein a power-up step $\Delta U$ for the power-up command is different from a power-down step $\Delta d$ for the power-down command. That is, when $\Delta U<\Delta d$, the mobile station decreases transmission power by wider steps level in response to the power-down command, and increases transmission power by narrower steps in response to the power-up command. For example, $\Delta U=0.5$ dB and $\Delta d-10$ dB. The base station can broadcast such power control step information as a system parameter to the mobile stations. By having the power-up step be different from the power-down step, the system is more stable when the base station releases the power control channel or when two or more mobile stations performs power control according to the power control commands for the same power control channel. A power up value and a power down value correspond to $\Delta U$ and $\Delta d$ respectively;

With regard to the power control method, the two mobile stations transmit control message frames to the base station over the common control channel. When it is judged that transmission power of the mobile station recognized by the base station is lower than a threshold, the base station sends power-up commands over the power control channel. However, when transmission power of the recognized mobile station is higher than the threshold, the base station sends power-down commands over the power control channel. Here, since the recognized mobile station uses the same long PN code as that used in the base station, the recognized mobile station can correctly receive the power control commands and control transmission power according to the received power control commands. When the base station continuously sends the power control commands to the mobile station for a predetermined time, the recognized mobile station correctly performs power control and transmits a message at proper transmission power.

However, when the unrecognized mobile station receives the power control commands transmitted from the base station, a long PN code for another user is added to the received power control commands. Therefore, when the unrecognized mobile station takes correlation for the received power control commands using the long PN code of its own, the number of power-up commands becomes nearly equal to the number of the power-down commands due to the PN sequence's property. Since the power-up step is narrower than the power-down step, although the number of the power-up commands is equal to the number of the power-down commands after sending many power control commands, transmission power of the unrecognized mobile station will decrease. During this process, when the transmission power of the unrecognized mobile station decreases to a specific value, the call is released.

Figure 24:
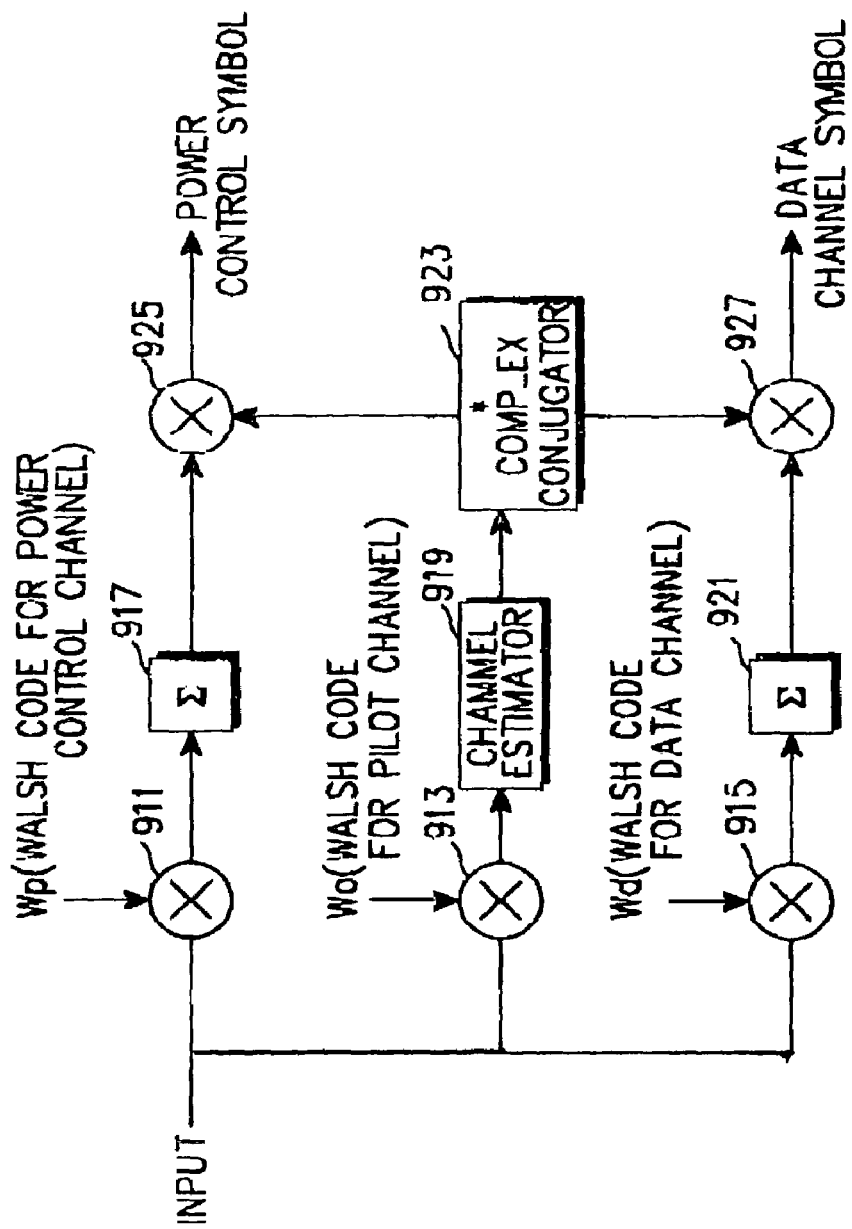
FIG. 24 is a block diagram illustrating a finger structure of a mobile station having a power control method according to an embodiment of the present invention.

FIG. 24 shows a finger structure of the mobile station having the shared power control channel.

Referring to FIG. 24, for despreading, an input signal is multiplied by orthogonal codes Wp, Wo and Wd for the power control channel, pilot channel and data channel in multipliers 911, 913 and 915, respectively. A channel estimator 919 estimates the pilot channel from the despread pilot channel signal output from the multiplier 913, and a complex conjugator 923 calculates a complex conjugate value from the output of the channel estimator 919 and provides the complex conjugate value to multipliers 925 and 927. At this point, the despread values of the power control channel, output from the multiplier 911 are accumulated on a symbol unit basis by an accumulator 917, and then multiplied by the output of the complex conjugator 923 in the multiplier 925, which outputs power control symbols to a power combiner. Further, the despread values of the data channel, output from the multiplier 915, are accumulated on a symbol unit basis by an accumulator 921, and then multiplied by the output of the complex conjugator 923 in the multiplier 927, which outputs data symbols to a data combiner.

Figure 25:
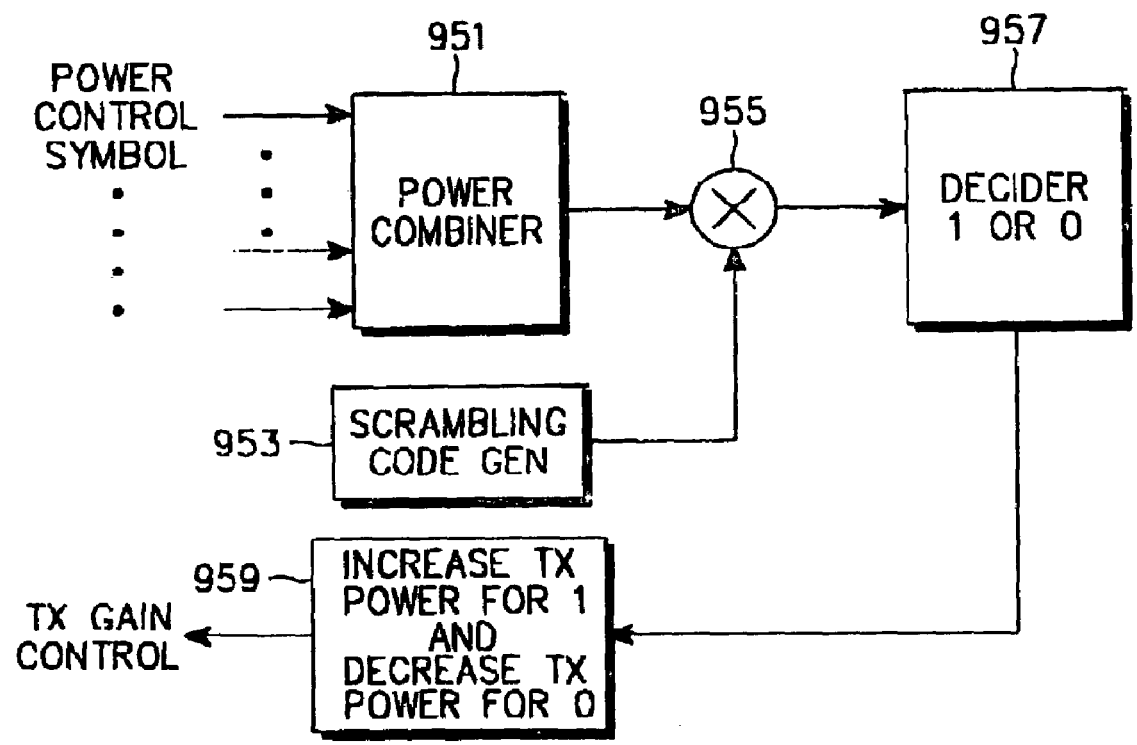
FIG. 25 is a block diagram illustrating a power combiner and a transmission power controller for a mobile station according to an embodiment of the present invention.

FIG. 25 shows a power combiner and a transmission power controller for a mobile station.

Referring to FIG. 25, the power control symbols calculated in each finger having the structure of FIG. 24 are combined by a power combiner 951, and the combined power control symbol output from the power combiner 951 is multiplied by a scrambling code output from a scrambling code generator 953 in a multiplier 955. A decider 957 then examines the power control command value output from the multiplier 955 and decides the examination result as '1' or '0'. Herein, for convenience, it is assumed that '1' denotes the power-up command and '0' denotes the power-down command. When the power control command transmitted from the base station is the power-up command, the mobile station increases transmission power by ΔU (dB), and when the power control command transmitted from the base station is the power-down command, the mobile station decreases transmission power by Δd (dB). The function of block 959 is to control the gain of the transmitter based on the decision of the 957. The output of the 959 is the gain of the transmitter and can be converted to an analogue value by a DA converter.

This power control method enables the system to release the channel without error when the base station does not transmit the power control command or stops transmission of the power control command without an advance notice. In addition, by having the power-up step be different from the power-down step of the mobile station, the novel power control method can reduce transmission power step by step, when the unrecognized mobile station performs power control according to the power control command for other mobile stations or when the base station releases the channel without a notice of channel release. The method for having the power-up step be different from the power-down step of the mobile station according to the power control command from the base station, can also be applied to a power control method in which the reverse power control bits are not scrambled with the long PN code, thereby contributing to stabilization of power control for the reverse common channel.

As described above, the embodiment of the present invention has a multi-step access method. Therefore, when a collision happens, the loss is decreased. Further, the novel power control method prevents the unrecognized mobile station from causing channel interference.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for controlling transmission power of a reverse common channel in a base station upon failure to acquire a signal transmitted over the reverse common channel, the method comprising the steps of:
   generating power-up commands for said signal for a first predetermined time having a predetermined power-up value; and
   generating power-down commands for said signal for a second predetermined time having a predetermined power-down value upon failure to acquire said signal for the first predetermined time.

2. The method as claimed in claim 1, wherein said signal is a preamble.

3. The method as claimed in claim 1, wherein said power-up value for the power-up command is not equal to said power-down value for the power-down command.

4. The method as claimed in claim 1, wherein said power-down value is greater than said power-up value.

5. A method for controlling transmission power of a reverse common channel in a mobile station, in which after being assigned the reverse common channel, the mobile station controls power of a transmission signal on the reverse common channel, the method comprising the steps of:
   transmitting the transmission signal at a given transmission power;
   decreasing power of the transmission signal in response to a power-down command from a base station;
   measuring a strength of a power command signal from a base station;
   comparing the strength of the power command signal with a predetermined value; and
   releasing the transmission signal when the strength of the power command signal is equal to or less than the predetermined value.

6. The method as claimed in claim 5, wherein the transmission signal is a preamble.

7. A method for controlling transmission power of a reverse common channel in a CDMA communication system upon failure to acquire a signal transmitted over the reverse common channel, the method comprising the steps of:
   generating, at the base station, a power-up command for the signal for a first predetermined time;
   transmitting, at the mobile station, the signal at a given transmission power according to the power-up command;
   generating, at the base station, a power-down command for the signal for a second predetermined time upon failure to acquire the signal for the first predetermined time;
   decreasing, at the mobile station, the signal power in response to the power-down command;
   measuring, at the mobile station, a strength of a power command signal from a base station;
   comparing, at the mobile station, the strength of the power command signal with a predetermined value; and
   releasing the signal when the strength of the power command signal is equal to or less than the predetermined value.

* * * * *

UNITED STATES PATENT AND TRADEMARK OFFICE
CERTIFICATE OF CORRECTION

PATENT NO. : 7,623,884 B2  Page 1 of 1
APPLICATION NO. : 10/365150
DATED : November 24, 2009
INVENTOR(S) : Moon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2038 days.

Signed and Sealed this

Twenty-sixth Day of October, 2010

David J. Kappos
*Director of the United States Patent and Trademark Office*